United States Patent
Marchand

(10) Patent No.: US 12,118,388 B2
(45) Date of Patent: Oct. 15, 2024

(54) SYSTEM, METHOD AND COMPUTER-ACCESSIBLE MEDIUM FOR A DOMAIN DECOMPOSITION AWARE PROCESSOR ASSIGNMENT IN MULTICORE PROCESSING SYSTEM(S)

(71) Applicant: NEW YORK UNIVERSITY IN ABU DHABI CORPORATION, Abu Dhabi (AE)

(72) Inventor: Benoit Marchand, Abu Dhabi (AE)

(73) Assignee: NEW YORK UNIVERSITY IN ABU DHABI CORPORATION, Abu Dhabi (AE)

( * ) Notice: Subject to any disclaimer, the term of this patent is extended or adjusted under 35 U.S.C. 154(b) by 486 days.

(21) Appl. No.: 17/618,797

(22) PCT Filed: Jun. 5, 2020

(86) PCT No.: PCT/US2020/036331
§ 371 (c)(1),
(2) Date: Dec. 13, 2021

(87) PCT Pub. No.: WO2020/251850
PCT Pub. Date: Dec. 17, 2020

(65) Prior Publication Data
US 2022/0253336 A1 Aug. 11, 2022

Related U.S. Application Data

(60) Provisional application No. 62/860,480, filed on Jun. 12, 2019, provisional application No. 62/947,375, filed on Dec. 12, 2019.

(51) Int. Cl.
*G06F 9/50* (2006.01)
(52) U.S. Cl.
CPC ..................... *G06F 9/50* (2013.01)

(58) Field of Classification Search
None
See application file for complete search history.

(56) References Cited

U.S. PATENT DOCUMENTS 6,725,211 B1 4/2004 Ashton et al.
7,644,130 B2 * 1/2010 Magro .................... H04L 61/30
709/201

(Continued)

FOREIGN PATENT DOCUMENTS

JP 2004 192400 A 7/2004

OTHER PUBLICATIONS

Hoefler et al.; "The scalable process topology interface of MPI 2.2"; Copyright 2010 John Wiley & Sons, Ltd.; (Hoefler_2011.pdf; pp. 1-18) (Year: 2010).*

(Continued)

*Primary Examiner* — Hiren P Patel
(74) *Attorney, Agent, or Firm* — Hunton Andrews Kurth LLP

(57) ABSTRACT

An exemplary system, method and computer-accessible medium for assigning a plurality of tasks to a plurality of computing nodes can include, for example, receiving first information related to the computing nodes, where the first information can include a number of cores in each of the computing nodes, generating second information by separating the number of cores in each of the computing nodes, and assigning the tasks to the computing nodes based on the second information. The first information can further include (i) a distance of a network connection between each of the computer nodes, and (ii) a bandwidth of the network connection. The second information can be generated based on the tasks. The second information can be generated based (Continued)

on a number of dimensions of the tasks. The tasks can be assigned based on a minimization of a number of communications between the nodes.

21 Claims, 19 Drawing Sheets

(56) References Cited

U.S. PATENT DOCUMENTS

| | | | | |
|---|---|---|---|---|
| 8,244,882 | B2* | 8/2012 | Davidson | H04L 67/1006 709/228 |
| 8,949,847 | B2* | 2/2015 | Kim | G06F 9/505 718/104 |
| 9,436,651 | B2* | 9/2016 | Underwood | G06F 15/167 |
| 9,483,319 | B2* | 11/2016 | Ujibashi | G06F 9/5027 |
| 9,665,405 | B1* | 5/2017 | Goodnight | G06F 17/16 |
| 9,742,867 | B1 | 8/2017 | Cavalier | |
| 10,754,706 | B1* | 8/2020 | Mo | G06F 9/5038 |
| 2002/0049859 | A1 | 4/2002 | Bruckert et al. | |
| 2004/0098447 | A1 | 5/2004 | Verbeke et al. | |
| 2006/0106931 | A1* | 5/2006 | Richoux | G06F 9/4881 709/227 |
| 2006/0184767 | A1 | 8/2006 | Le et al. | |
| 2008/0028413 | A1 | 1/2008 | Conklin et al. | |
| 2010/0153542 | A1 | 6/2010 | Arimilli et al. | |
| 2013/0090907 | A1 | 4/2013 | Maliassov | |
| 2013/0198426 | A1 | 8/2013 | Lopez Bueno et al. | |
| 2014/0223016 | A1 | 8/2014 | Varney et al. | |
| 2014/0228115 | A1 | 8/2014 | Kaplan et al. | |
| 2015/0186184 | A1 | 7/2015 | Kim | |
| 2016/0239597 | A1 | 8/2016 | Shimizu | |
| 2017/0277571 | A1* | 9/2017 | Yoo | G06F 9/5027 |
| 2018/0276044 | A1 | 9/2018 | Fong et al. | |

OTHER PUBLICATIONS

Karlsson et al; "Optimizing Process-to-Core Mappings for Application Level Multi-dimensional MPI Communications"; 2012 IEEE International Conference on Cluster Computing (Karlsson_2012. pdf; pp. 1-9) (Year: 2012).*
Jesper Larsson Traff; "Implementing the MPI Process Topology Mechanism"; Proceedings of the IEEE/ACM SC2002 Conference; (Traff_2002.pdf; pp. 1-14) (Year: 2002).*
International Search Report and Written Opinion for International Application No. PCT/US2020/036331 mailed on Dec. 17, 2020.
https://ieeexplore.ieee.org/abstract/document/6702677.
https://pdfs.semanticscholar.org/be9c/63c174dd363343227ffd266d68f321a9f456.
https://www.hpcadvisorycouncil.com/pdf/WRF_Analysis_and_Profiling_AMD_6276.
https://slurm.schedmd.com/topology.html.
https://slurm.schedmd.com/sbatch.html.
https://slurm.schedmd.com/core_spec.html.
https://docs.oracle.com/cd/E19957-01/820-0698/6ncdvjcmd/index.html.
http://gridengine.eu/grid-engine-internals?start=10.
http://docs.adaptivecomputing.com/torque/4-1-3/help.htm#topics/2-jobs/requestingRes.htm.
https://www.ibm.com/support/knowledgecenter/en/SSETD4_9.1.2/lsf_command_ref/bsub.1.html.
https://www.open-mpi.org/doc/v3.0/man1/mpiexec.1.php.
https://support.hpe.com/hpesc/public/docDisplay?docId=a00113914en_us&page=Use_Automatic_Rank_Order_Analysis.html.
http://www.hector.ac.uk/coe/cray-xe6-workshop-2012-Nov/pdf/craypat.
http://gridscheduler.sourceforge.net/.
https://www.altair.com/pbs-professional/.
https://www.pbspro.org/.
https://www.mcs.anl.gov/research/projects/openpbs/.
https://support.adaptivecomputing.com/wp-content/uploads/2019/06/Moab-HPC-Suite_datasheet_20190611.
https://research.cs.wisc.edu/htcondor/.
https://www.open-mpi.org/.
http://mvapich.cse.ohio-state.edu/.
https://www.mpich.org/.
http://www.openshmem.org/site/.
https://www.openmp.org/.
https://www.csm.ornl.gov/pvm/.
https://support.hpe.com/hpesc/public/docDisplay?docId=a00115110en_us&docLocale=en_US&page=Cray_Message_Passing_Toolkit_(CMPT).html.
https://downloads.linux.hpe.com/SDR/project/mpi/.
https://software.intel.com/en-us/mpi-library.
https://www.ibm.com/products/spectrum-mpi/details.
Communication Pursuant to Rules 70(2) and 70a(2) EPC dated Feb. 23, 2023 for European Patent Application No. 20822783.5.
Supplemental European Search Reported dated Feb. 6, 2023 for European Patent Application No. 20822783.5.

* cited by examiner

24 MPI Ranks Process Placement in 2D 6x4 Data Grid
Mapped in Serial Order to 4 Nodes with 6 Cores Each

| Node 1 | Rank 0 (1,1) | Rank 1 (2,1) | Rank 2 (3,1) | Rank 3 (4,1) | Rank 4 (5,1) | Rank 5 (6,1) — 805 |
| Node 2 | Rank 6 (1,2) | Rank 7 (2,2) | Rank 8 (3,2) | Rank 9 (4,2) | Rank 10 (5,2) | Rank 11 (6,2) |
| Node 3 | Rank 12 (1,3) | Rank 13 (2,3) | Rank 14 (3,3) | Rank 15 (4,3) | Rank 16 (5,3) | Rank 17 (6,3) |
| Node 4 | Rank 18 (1,4) | Rank 19 (2,4) | Rank 20 (3,4) | Rank 21 (4,4) | Rank 22 (5,4) | Rank 23 (6,4) |

Figure 8

Real to Virtual MPI Process Mapping

Original MPI Process Placement

Node 1: Rank 0, Rank 1, Rank 2, Rank 3, Rank 4, Rank 5
Node 2: Rank 6, Rank 7, Rank 8, Rank 9, Rank 10, Rank 11
Node 3: Rank 12, Rank 13, Rank 14, Rank 15, Rank 16, Rank 17
Node 4: Rank 18, Rank 19, Rank 20, Rank 21, Rank 22, Rank 23

Map_Real_to_Virtual(Node1-Rank3) = Node1-vRank5

Map_Virtual_to_Rea(Node2-vRank4) = Node1-Rank7

Optimal MPI Process Placement

Node 1: vRank 0, vRank 1, vRank 2, vRank 6, vRank 7, vRank 8
Node 2: vRank 3, vRank 4, vRank 5, vRank 9, vRank 10, vRank 11
Node 3: vRank 12, vRank 13, vRank 14, vRank 18, vRank 19, vRank 20
Node 4: vRank 15, vRank 16, vRank 17, vRank 21, vRank 22, vRank 23

Figure 11

Sub-Gridding an 18 Cores Node

1x18 Sub-Grid
Intra: 17*2=34
Inter: 18*2+2=38
Total: 72

2x9 Sub-Grid
Intra: 8*2*2+9*2=50
Inter: 9*2+2*2=22
Total: 72

4x4 + 1x2 Sub-Grids
Intra: 3*4*2*2+3*2=54
Inter: 4*4+2=18
Total: 72

N.B. "send" communications only

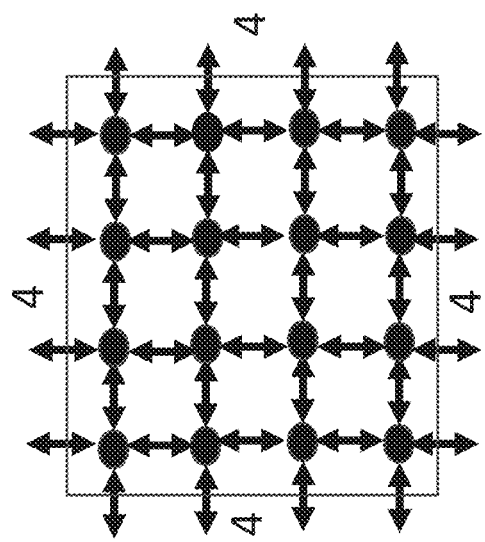

SYSTEM, METHOD AND COMPUTER-ACCESSIBLE MEDIUM FOR A DOMAIN DECOMPOSITION AWARE PROCESSOR ASSIGNMENT IN MULTICORE PROCESSING SYSTEM(S)

CROSS-REFERENCE TO RELATED APPLICATION(S)

This application relates to and claims priority from International Patent Application No. PCT/US2020/036331 filed Jun. 5, 2020 that published as International Patent Publication No. WO 2020/251850 on Dec. 17, 2020, which claims the benefit and priority from U.S. Patent Application No. 62/860,480, filed on Jun. 12, 2019, and 62/947,375, filed on Dec. 12, 2019, the entire disclosures of which are incorporated herein by reference.

FIELD OF THE DISCLOSURE

The present disclosure relates generally to multicore processing, and more specifically, to exemplary embodiments of an exemplary system, method, and computer-accessible medium for a domain decomposition aware processor assignment in multicore processing system(s).

BACKGROUND INFORMATION

Between 2007 and 2018, processor designs used in high-performance computing ("HPC") grew from 4 cores to 28 cores per processor, and the interconnect bandwidth grew from about 1 Gbps to about 100 Gbps. However, since mid-2018, there have been new disruptive processor designs that boost processor core count up to 64 (e.g., 128 cores per dual-processor compute node). These new processor designs considerably reduce computing cost, providing greater economic efficiency. Unfortunately, interconnect technologies are not keeping up with processor price and performance improvements.

As the number of cores per processor increases, the need to scale communications between processors and computers also increases. The use of Multi-rail interconnect ports can facilitate the likes of Ethernet, OmniPath, and Mellanox Infiniband to scale by facilitating more than 1 interconnect link to transport data between nodes. Unfortunately, this requires doubling, tripling, or even quadrupling of the interconnect infrastructure size and cost. Thus, this reduces or negates the price advantage of large core count processor systems.

In practice to double the bandwidth sustained by an interconnect cable, the number of optic fibers, or copper cables, should be doubled. This results in an exponential cost increase of the interconnect fabric, while processor cores cost decrease at an exponential rate.

As an alternative to interconnect performance, the inter-process communication performance can be modified using spatial locality of reference where Message Passing Interface ("MPI") processes that are likely to exchange data are co-located on the same node to the extent possible. Workload managers (e.g., SLURM, PBS, Torque, SGE, LSF, etc.) have limited support for process placement policies, none of which implements efficient grid topologies. As for MPI, the placement of processes can be left to the workload manager, although OpenMPI can provide the ability to manually override that placement through user-supplied rank files. CrayPAT, a proprietary technology from Hewlett-Packard Enterprise, incorporates a process placement mechanism within its proprietary MPI implementation that supports 2D and 3D grid topologies with major restrictions limiting its use, however.

Quickly evolving disruptive processor designs mean that HPC systems have become increasingly composed of heterogeneous processor technologies. Currently, process placement technology that optimizes communications across heterogeneous systems likely remains unknown. In particular, existing MPI process placement mechanisms are static. Thus, they must know ahead of time the compute nodes configurations, and the initial process placement mapping. This limitation hampers the workload management tools ability to optimize system utilization. Further, existing MPI process placement mechanisms are version specific; to make use of this feature, users must port their applications to these specific MPI versions.

CrayPAT, the only MPI process placement mechanism to support grid topology process placement can be limited to two-dimension (2D) and three-dimension (3D) communication patterns, and does not support multiple program multiple data ("MPMD") programming paradigms, or heterogeneous compute node configurations.

Thus, it may be beneficial to provide exemplary system, method, and computer-accessible medium for processor assignment in multicore processing systems, which can address and/or overcome at least some of the deficiencies described herein above.

SUMMARY OF EXEMPLARY EMBODIMENTS

Thus, exemplary system, method, and computer-accessible medium according to exemplary embodiments of the present disclosure can be provided for assigning a plurality of tasks to a plurality of computing nodes. For example, it is possible to receive first information related to the computing nodes, where the first information can include a number of cores in each of the computing nodes. Further, second information can be generated by separating the number of cores in each of the computing nodes, and assigning the tasks to the computing nodes based on the second information. The first information can further include, non-exhaustively, (i) a distance of network connection computer nodes, (ii) a bandwidth of the network connection, and (iii) the proximity of the network connection (e.g. bus location within a node). The first information can further include a distance to a nearest neighbor node(s). The second information can be generated based, non-exhaustively, on a number of dimensions of the tasks, or any other a priori knowledge of communication patterns or statistics among the tasks. The tasks can be assigned based on a minimization of a number of inter-node communications.

In some exemplary embodiments of the present disclosure, information related to a problem characteristic(s) associated with at least one of the tasks can be obtained, and the tasks can be assigned to the computing nodes based on the problem characteristic(s). The problem characteristic(s) can include (i) a first number of dimensions in a grid, (ii) a second number of dimensions in an axis of the grid, or (iii) a third number of points of the grid in a Message Passing Interface process. The problem characteristics can be multi-dimensional. For example, a dimension along an axis can be further characterized by the adjunction of a percentage, or weight, associated with communications along this axis. An optimal sub-grid layout can be determined based on the problem characteristic(s), and the tasks can be assigned based on the optimal sub-grid layout. The tasks can be Message Passing Interface processes. A computing topology can be determined for the computing nodes. The second information can be generated after the determination of the computing topology.

In certain exemplary embodiments of the present disclosure, third information related to a change in the computing topology can be determined, fourth information can be generated by separating the number of cores based on the third information, and the tasks can be reassigned based on the third information and the fourth information. The computing nodes can be polled, and the first information can be generated based on the poll. The second information can be generated, and the tasks can be assigned using a workload manager. A simulation(s) can be performed that can include simulating an assignment of the tasks to the computing nodes, and the tasks can be assigned based on the simulation(s). The simulation(s) can be performed based on an application statistic(s), where the application statistic(s) can include statistics from a previous simulation(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 8 is an exemplary diagram of the associated default MPI process placement of the two-dimensional data grid shown in FIG. 7 according to an exemplary embodiment of the present disclosure;

FIG. 11 is an exemplary diagram illustrating process placement optimization mapping of a real MPI process ID to a virtual MPI process ID as a component according to an exemplary embodiment of the present disclosure;

FIG. 17 is an exemplary diagram illustrating the optimization of sub-gridding using an exemplary procedure according to an exemplary embodiment of the present disclosure;

Figure 1:
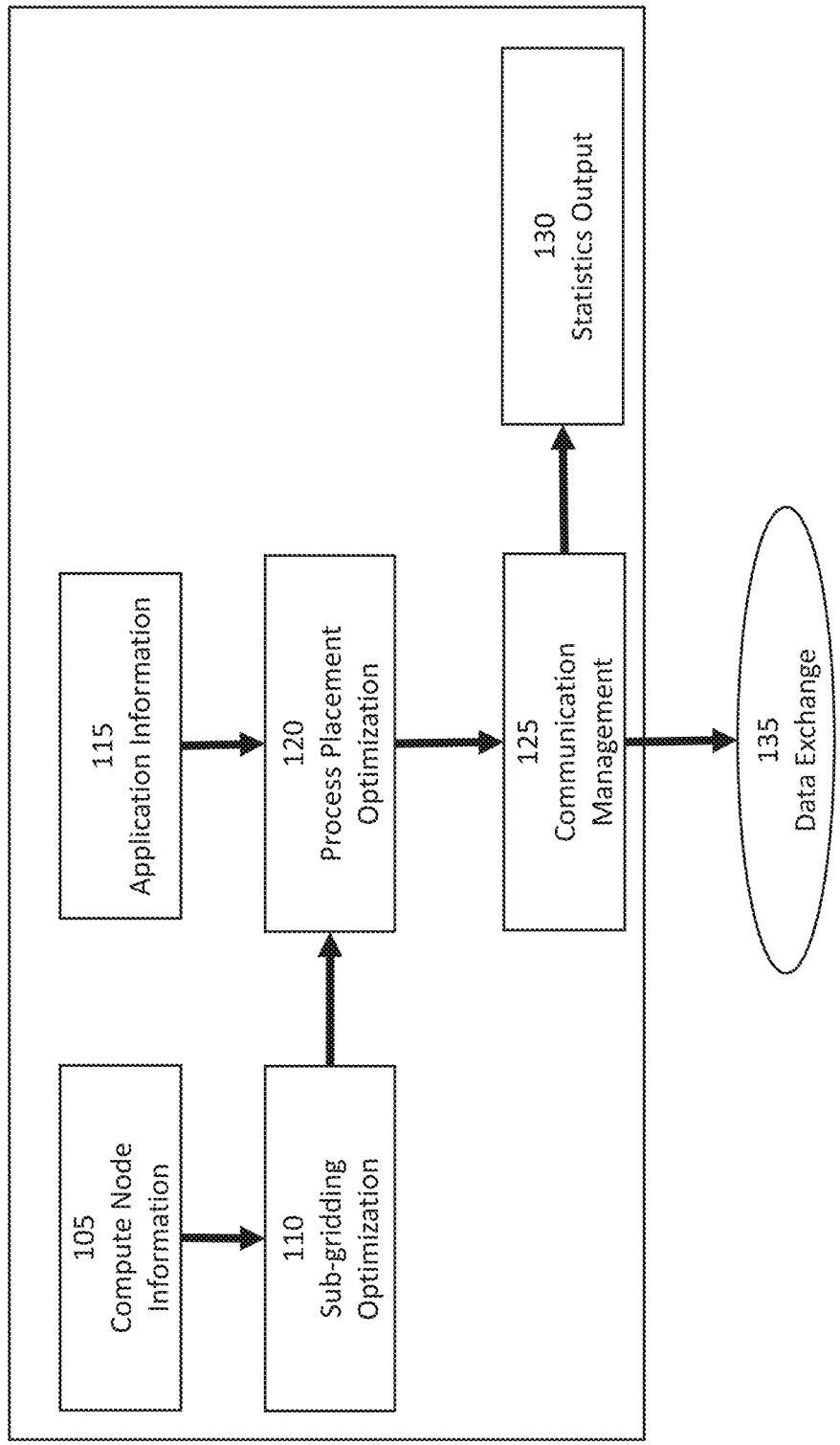
FIG. 1 is an exemplary diagram of an exemplary system for optimizing communications between processes on multicore systems according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Exemplary Terminology

The following exemplary and non-limiting definitions can be used with the exemplary embodiments described herein.

For example, the term "compute node" can refer to a computing device configured to exchange data with other computing devices by a communication device, such as shared memory, processor bus, Ethernet, Infiniband, etc. Thus, for example, groups of processor cores connected by a memory cache within a single processor can be "compute nodes". Independent processors within a share memory computer connected by a system bus, or other communication device, can also "compute nodes". Further, computers connected by an interconnect fabric can be "compute nodes." The exemplary definition of computing device can also include but is not limited to accelerators, such as, but not limited to, floating point unit, graphics processing unit, field programmable gate array, and memory-resident processors.

"Inter-node communications" can refer to the exchange of data between compute capable devices.

"Intra-node communications" can refer to the exchange of data occurring within a computing device.

"Halo communication patterns" and "Cartesian communication patterns" can be used interchangeably. Such exemplary communication patterns can include communications with neighbors being on a grid (e.g., one or more dimensions) as on a Cartesian graph. Neighbors can be further than one (1) grid element away in one or more dimension (e.g., diagonal neighbors).

"Message Passing Interface (MPI)" can be any suitable tool, configuration and/or system that can include the exchange of information between processes. However, the present disclosure is not limited to the MPI standard; it is applicable to other forms of message passing, for example, using a user-callable function to initiate data transfers, or shared memory.

Exemplary MPI implementations can include OpenMPI (see, e.g., Reference 23), MPICH (see, e.g., Reference 25), MVAPICH (see, e.g., Reference 24), Cray MPT (see, e.g., Reference 29), HPE MPI (see, e.g., Reference 30), Intel MPI (see, e.g., Reference 31), and IBM MPI. (See, e.g., Reference 32). The exemplary system, method, and computer-accessible medium, according to an exemplary embodiment of the present disclosure, can apply to, or utilize, any MPI implementation.

"Parallel Virtual Machine" (see, e.g., Reference 28) can be an additional message passing toolkit, which can be used with, or by, the exemplary system, method, and computer-accessible medium.

Other data exchange mechanisms, such as, but not limited to, Linux/UNIX sockets communications can also be included, or used by, the exemplary system, method, and computer-accessible medium. OpenSHMEM (see, e.g., Reference 26) communications (e.g., explicit share memory data exchanges), OpenMP (see, e.g., Reference 28) (e.g., implicit shared memory data exchange), and other suitable data exchange mechanisms can be incorporated in, or used by, the exemplary system, method and computer-accessible medium.

The terms MPI rank, MPI thread, MPI process, tasks, and process can be used interchangeably to identify any executable running on a computing capable device. The executable can itself be a piece of software resulting from compiling a program, as well as a machine language function embedded within a processing device, or any other mechanism though with a computing device executes a programmable function. Processes can equally use a processor core, a number of processor cores potentially spanning more than one processor and subcomponents of processor cores such as processor threads.

"Workload Management System" can be a suitable mechanism through which available computing devices can be selected to execute processes. For example, SGE (see, e.g., Reference 14), LSF (see, e.g., Reference 16), PBS (see, e.g., References 17 and 18), Condor (see, e.g., Reference 20), LoadLeveler (see, e.g., Reference 22), Torque (see, e.g., Reference 9)], Moab (see, e.g., Reference 19), SLURM (see, e.g., Reference 23), etc. can be commonly used to perform this function on compute clusters. This exemplary mechanism can also be provided by manual compute nodes and/or processor core selections. This mechanism is not a requirement to the present disclosure embodiment: processes can be statically assigned, and their mapping can be optimized through the present disclosure's operation.

The exemplary system, method, and computer-accessible medium, according to an exemplary embodiment of the present disclosure, can be used to assign tasks to specific nodes in a computing topology. For example, the exemplary system, method, and computer-accessible medium can analyze the resources available in a computing topology, and assign tasks specifically based on the available resources. The computing topology can include, for example, the number of nodes (e.g., computers), the number of processing cores per node, the network distance between nodes, and the bandwidth of the network. The exemplary system, method, and computer-accessible medium can then subdivide each node based on the number of processing cores per node. This can be performed, prior to dispatching MPI processes onto compute nodes, or once the computing topology can be first established (e.g., MPI processes have been instantiated on the compute nodes allocated for this purpose), and can be periodically updated based on changes to the computing topology. Alternatively, or in addition, the task being performed can be analyzed, and the nodes can be divided specifically based on the task being performed.

The exemplary system, method, and computer-accessible medium, according to an exemplary embodiment of the present disclosure, can include procedures for managing a workload manager utility and an MPI library. The MPI library can include, for example, any message-passing library, Parallel Virtual Machine, Remote Direct Memory Access library, socket based mechanism (e.g., Unix sockets), any library utilized to exchange data implicitly or explicitly between two running processes whether they share memory, or each possesses its private virtual memory address space), and the end-user application itself, as well as shimmed communication libraries (e.g., libraries that intercept other library calls to alter their functionality).

When each node is, for example, subdivided based on the number of processing cores per node, the exemplary system, method, and computer-accessible medium can assign specific tasks to each node. Tasks can span more than one processor core. Nodes can be assigned based on the task being performed, which can include accounting for the number of cores per node, as well as the distance between a particular node and the nearest nodes that can be needed to perform the task. Once all nodes can be assigned, the exemplary system, method, and computer-accessible medium can provide each node with the specific task to be performed.

The exemplary system, method and computer-accessible medium, according to an exemplary embodiment of the present disclosure, can for example, (i) obtain information about the number of processor cores per computer node, (ii) obtain information about the application's problem characteristics (e.g., the number of dimensions in the grid, the dimensions in all grid axis, and/or the number of grid points per MPI process), (iii) utilize the above information to determine the optimal sub-grid layout per computer node, and (iv) utilize the results of procedures (i)-(iii) above to determine the number of processor nodes utilized for the execution. The problem characteristics can be multi-dimensional. For example, a dimension along an axis can be further characterized by the adjunction of a percentage, or weight, associated with communications along this axis FIG. 1 shows an exemplary diagram of an exemplary system 100 for scaling communications between processes on multicore systems according to an exemplary embodiment of the present disclosure. For example, Compute Node Information 105 can be acquired and passed to a Sub-gridding Optimization Module 110. The optimized sub-gridding information can be passed to a Process Placement Optimization module 120. Application Information 115 can be acquired and passed to Process Placement Optimization module 120. The determined optimal process placement can be passed to Communication Management module 125. The Communication Management Module 125 can interface with an exemplary Data Exchange 135, and can pass communication information to a Statistics Output module 130.

Sub-gridding Module 110 and Process Placement Optimization module 120 can be used together or independently of one another. Additionally, each procedure can be implemented (i) as a standalone utility, (ii) integrated within the workload manager's process binding, distribution, placement, etc. mechanism, (iii) as a plug-in module to the workload manager utility called by the utility prior to executing the applications, (iv) by the MPI library, (v) as an independent library called by the end-user applications, and/or (vi) integrated to the end-user application.

Figure 2:
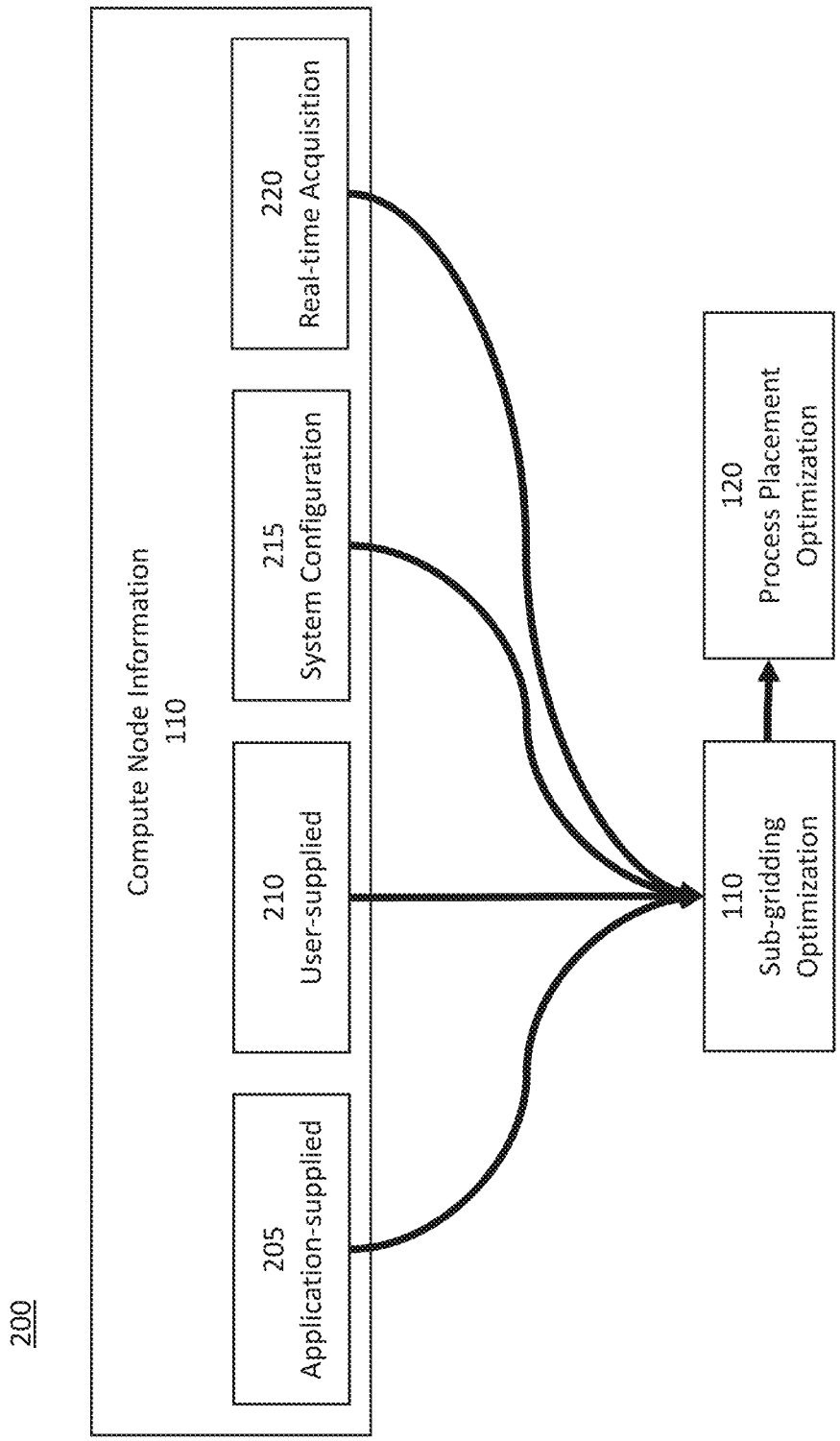
FIG. 2 is an exemplary diagram of an exemplary system for dividing a component A1 (e.g., compute node information) shown in FIG. 1 into a plurality of subcomponents according to an exemplary embodiment of the present disclosure.

FIG. 2 shows an exemplary diagram of an exemplary system 200 for dividing Compute Node Information 105 illustrated in FIG. 1 into a plurality of subcomponents according to an exemplary embodiment of the present disclosure. Compute Node Information 110 can be obtained using Application-Supplied information 205, which includes information on how to operate, or problem related characteristics that can be used to determine a suitable sub-gridding solution, using (i) User Supplied information 210, (ii) System Configuration information 215 (e.g., information maintained by a workload management utility), or (iii) Real-Time Acquired information 220, which can be obtained by polling compute nodes once MPI processes have been dispatched, or any other suitable mechanism which can provide information regarding the compute node configurations, interconnect configuration, etc. This information can be passed to Sub-gridding Optimization module 110, which can then proceed to Process Placement Optimization module 120 to determine an exemplary sub-gridding solution that can minimize inter-node communications based the operational environment.

Figure 3:
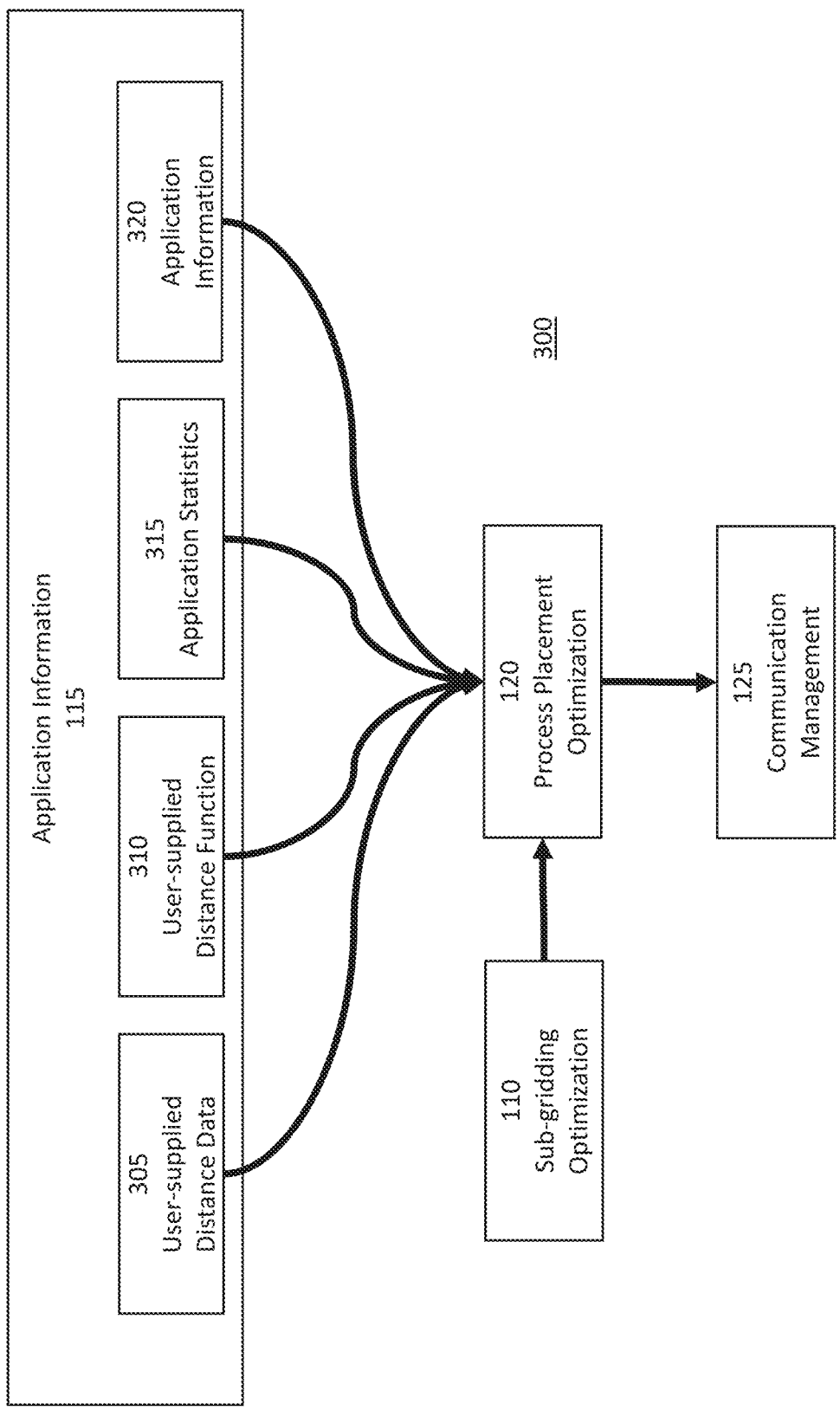
FIG. 3 is an exemplary diagram of a system for dividing a component (e.g., application information) shown in FIG. 1 into a plurality of subcomponents according to an exemplary embodiment of the present disclosure.

FIG. 3 shows an exemplary diagram of a system for dividing a component (e.g., Application Information 115) illustrated in FIG. 1 into a plurality of subcomponents according to an exemplary embodiment of the present disclosure. Application related information that can be used to determine an optimal process placement can be obtained through a various suitable procedures, such as, but not limited to, using (i) User-Supplied Distance Data 305, (ii) User-Supplied Distance Function 110, (iii) Application Statistics 115, and (iv) Application Information 320. This information can be passed to Process Placement Optimization module 120. User-supplied Distance Data 305, for example, can include numerical expressions (e.g. a number) that can specify the MPI rank position difference between communicating MPI processes, while User-Supplied Function 310 can represent the MPI rank position difference of communicating MPI processes through an exemplary mathematical function. Application Statistics 315, which can be from previous runs, can be reused, for example, to determine the prevalence of MPI process communication exchanges, and Application Information 320 can present the Process Placement Optimization module 120 with information on expected communication exchanges.

Figure 4:
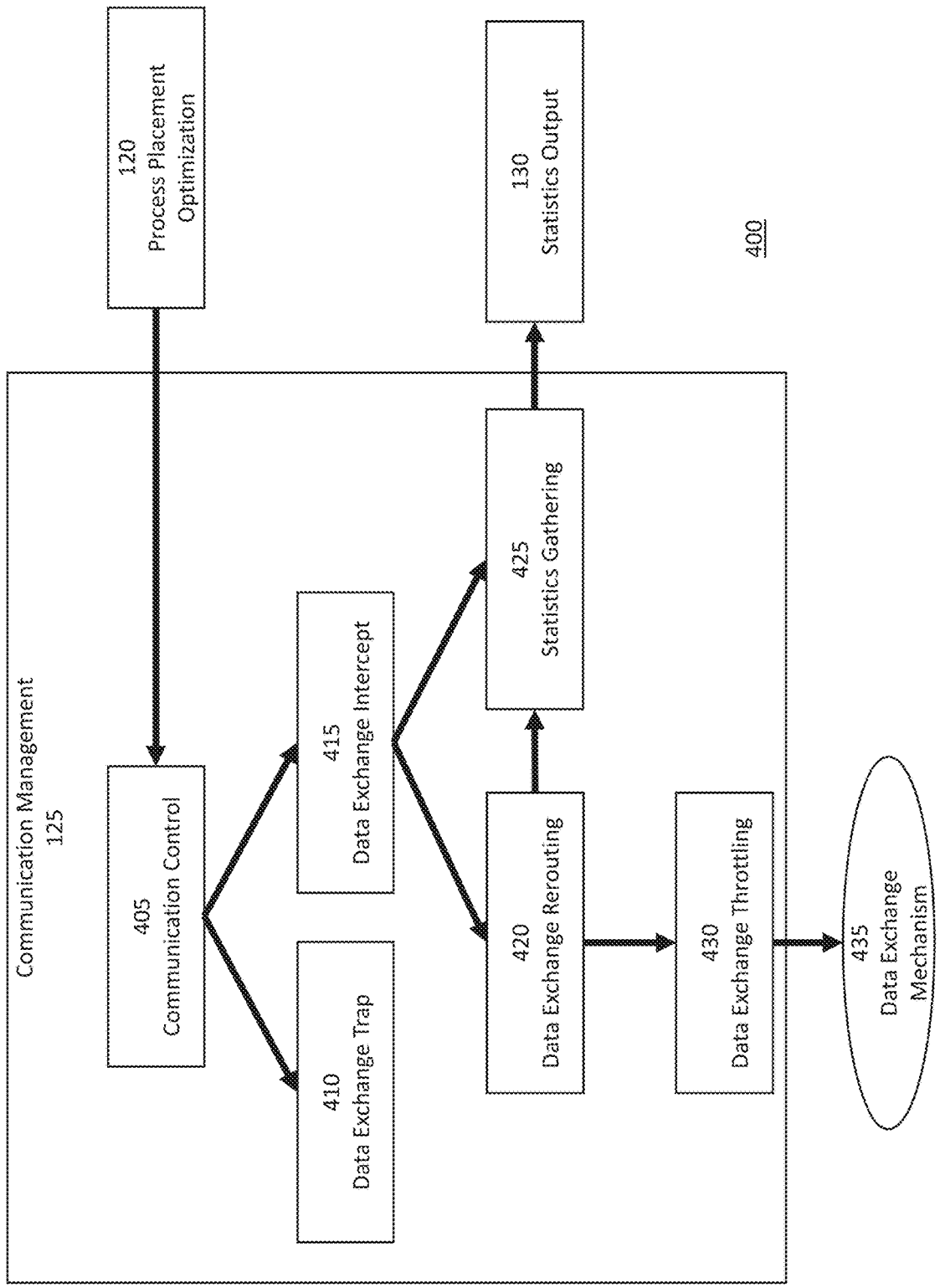
FIG. 4 is an exemplary flow diagram of a method for dividing a component (e.g., communication management) shown in FIG. 1 into a plurality of subcomponents according to an exemplary embodiment of the present disclosure.

FIG. 4 shows an exemplary diagram of a system 400 for dividing a component (e.g., Communication Management 125) illustrated in FIG. 1 into a plurality of subcomponents according to an exemplary embodiment of the present disclosure, which can be implemented separately from a data exchange mechanism (e.g., MPI). If implemented within an MPI tool, Communication Management module 125 may not be needed. In an exemplary embodiment of the present disclosure, Communications Management 125 can be divided into a number of subsystems, such as, but not limited to, (i) Communication Control module 405, (ii) Data Exchange Trap module 410, (iii) Data Exchange Intercept module 415, (iv) Data Exchange Rerouting module 420, (v) Statistics Gathering module 425, and (vi) Data Exchange Throttling module 430.

Communication Control module 405 can receive information about process placement obtained in Process Placement Optimization 120, and can setup a new MPI process mapping (e.g., using functionality of the underlying data exchange mechanism). In order to operate separately from the underlying MPI tool (e.g., data exchange mechanism) Communication Control module 405 can setup Data Exchange Trap module 410 such that future MPI calls can be intercepted at Data Exchange Intercept module 415. Once an MPI data exchange can be intercepted at Data Exchange Intercept module 415, Statistics Gathering module 425 can be used to record various statistics, and the data exchange request can be sent to Data Exchange Rerouting module 420. The exemplary rerouting procedure performed by Data Exchange Rerouting module 420 can use the output from Sub-gridding Optimization module 110 to determine the location of the MPI process. The rerouting process performed by Data Exchange Rerouting module 420 can also log communication statistics from Statistics Output module 130. After the data exchange routing can be completed, the data exchange can be passed to a Data Exchange 435, which can be used to perform throttling by Data Exchange Throttling module 430. An exemplary throttling mechanism can be added to mimic the performance of a lower performance interconnect by measure the amount of data passing through the interconnect on a compute node during a period of time, and to delay messages to simulate the performance of a slower interconnect.

An exemplary Statistics Gathering Module 425 embodiment can track, for example but not exhaustively, the number of messages passed between MPI peers, the total amount of data passed between MPI peers, and the frequency (for example MBytes/second) of data exchanges between MPI peers. This information can be used, for example, to determine the traffic patterns between MPI processes, or compute nodes.

Below is an example of the Statistics Output 130 information which can be generated through an exemplary Statistics Gathering Module 425. Here we see that 1024 MPI processes were spread on 16 compute nodes with 64 cores each. Host #0 sent 32083 MBytes to other nodes while receiving 37679 MBytes from other nodes, for a total of 69672 MBytes of inter-node traffic, meanwhile the intra-node traffic was 953 GBytes. We also see that MPI rank #2 residing at compute node 0 exchanged 2,317,306,272 Bytes with MPI rank #34 (also residing at node 0).

```
#Ranks=1024 #Nodes=16 #cores/node=64
host[ 0] (SEND/RECV/COMB) inter-comm=32083M/37679M/69762M intra-
comm=438G/515G/953G
host[ 1] (SEND/RECV/COMB) inter-comm=46607M/54634M/101241M intra-
comm=438G/513G/953G
host[ 2] (SEND/RECV/COMB) inter-comm=46649M/54683M/101333M intra-
comm=439G/514G/955G
host[ 3] (SEND/RECV/COMB) inter-comm=32083M/37679M/69762M intra-
comm=438G/515G/953G
Etc.
Rank[0 @ 0]: total=4016468064 : 32 @ 0 {2209450560},1 @ 0 {1807017504}
Rank[1 @ 0]: total=5931341280 : 33 @ 0 {2317306272},0 @ 0 {1807017504},2 @ 0
{1807017504}
Rank[2 @ 0]: total=5931341280 : 34 @ 0 {2317306272},1 @ 0 {1807017504},3 @ 0
{1807017504}
Rank[3 @ 0]: total=5931341280 : 35 @ 0 {2317306272},2 @ 0 {1807017504},4 @ 0
{1807017504}
Etc.
```

The exemplary Sub-gridding Optimization module 110 and Process Placement Optimization module 120 can be implemented and/or utilized within the workload manager. Sub-gridding Optimization module 110 and Process Placement Optimization module 120 can be (i) integrated with the topology or process distribution or process binding mechanisms, and/or (ii) part of a pre-execution plug-in module. If Sub-gridding Optimization module 110 and Process Placement Optimization module 120 are integrated with the workload manager internal mechanisms, then the number of computer nodes utilized can be determined by the workload manager at job submission time. If Sub-gridding Optimization module 110 and Process Placement Optimization module 120 are integrated as a pre-execution plug-in module, then the number of computer nodes utilized can be set by the user at job submission time, and can be adjusted lower by the workload manager utility.

Figure 5:
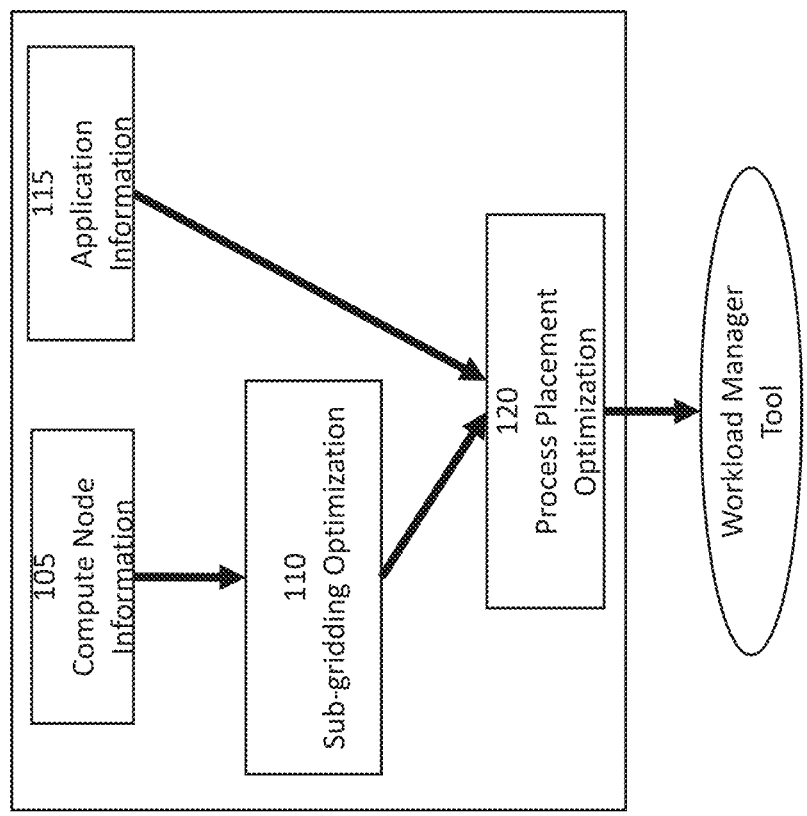
FIG. 5 is an exemplary flow diagram of an exemplary method for interfacing with a workload manager utility according to an exemplary embodiment of the present disclosure.

FIG. 5 shows an exemplary diagram of an exemplary system 500 for interfacing with a workload manager utility according to an exemplary embodiment of the present disclosure. As illustrated in FIG. 5, Compute Node Information module 105, Sub-gridding Optimization module 110, Application Information module 115, and Process Placement Optimization module 120 can be used in conjunction with a workload management utility, either integrated within the utility as a plug-in module to the utility, or external to the utility. Additionally, it is possible to implement an exemplary embodiment of the present disclosure as a standalone tool and/or system that can generate information which the user can supply to (i) the workload manager, (ii) the workload manager utility, (iii) the MPI library, (iv) the end-user application through common line argument, parameters, environment variables, and/or (v) as a standalone tool.

Each of Sub-ridding Optimization module 110 and Process Placement Mapping Optimization module 120 can be implemented together or independently from one another, and/or can be incorporated into (i) a workload manager tool, (ii) an MPI library tool, (iii) as an application program interface ("API"), or (iv) other mechanism, to enhance the functionality of other software tools and applications.

Additionally, Sub-gridding Optimization module 110 and Process Placement Mapping Optimization module 120 can be used as standalone tools or systems to generate an optimized process placement file, such as SLURM's rankfile mechanism so that neither the workload manager utility, MPI library, nor the end-user application needs any modification.

Figure 6:
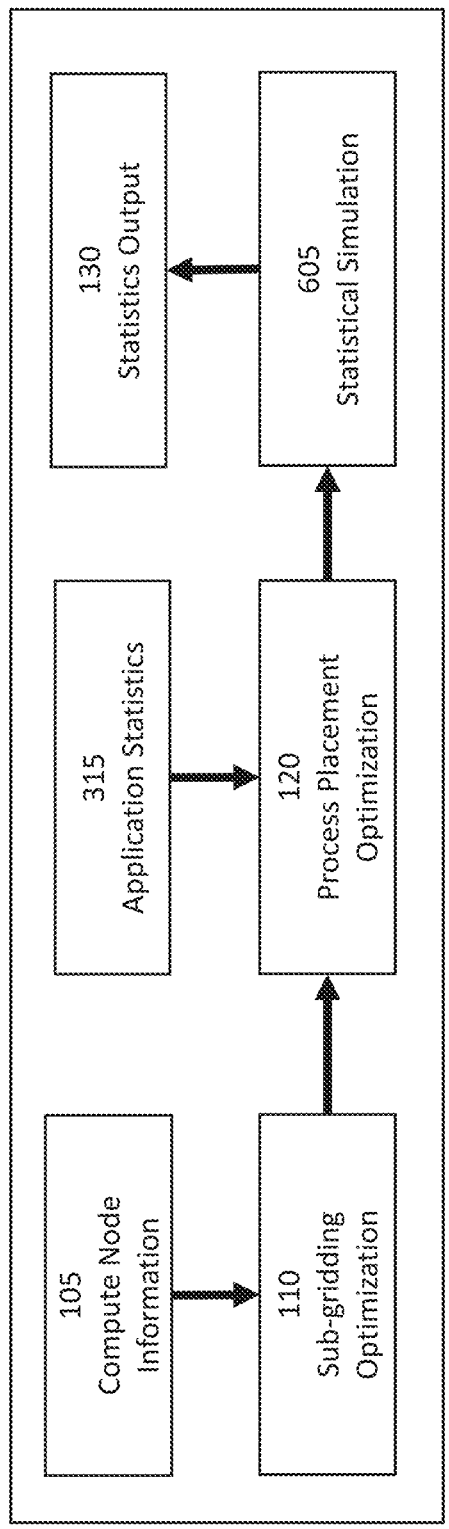
FIG. 6 is an exemplary diagram of an exemplary system for providing a priori data exchange estimations for various execution scenarios according to an exemplary embodiment of the present disclosure.

Compute Node Information module 105, Sub-gridding Optimization module 110, Application Information module 115, Process Placement Optimization module 120, and Statistics Output module 130 be implemented in a stand-alone system, and, for example, together with Statistical Simulation module 605 shown in FIG. 6, can facilitate simulation and performance estimations a priori using previously recorded application statistics. Thus, users can estimate the impact of using various node and interconnect configurations without having to rerun an application on the target configuration.

Figure 7:
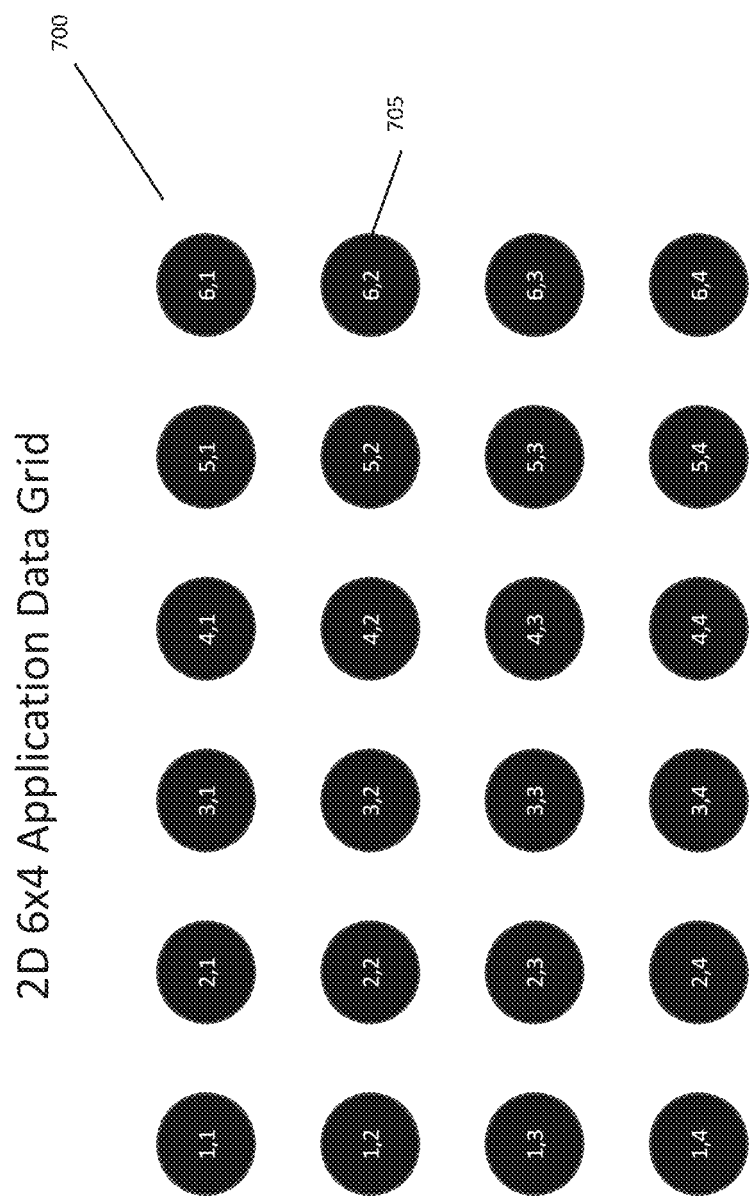
FIG. 7 is an exemplary diagram of a two-dimensional process data grid according to an exemplary embodiment of the present disclosure.
Figure 9:
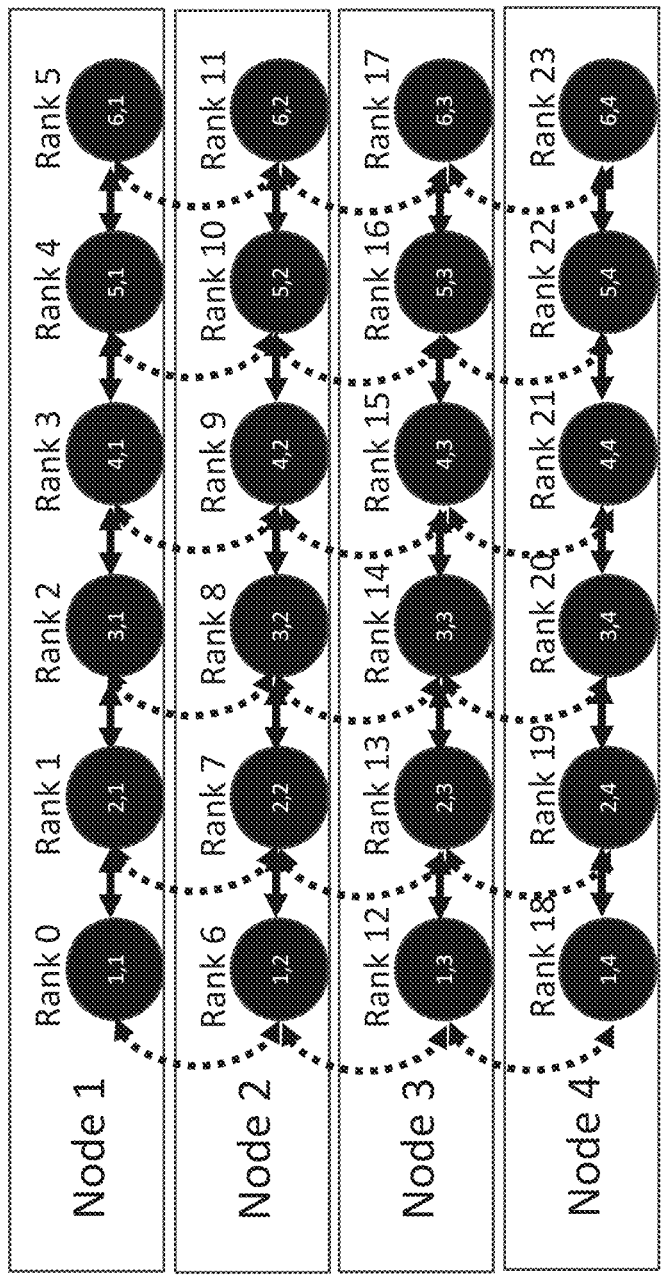
FIG. 9 is an exemplary diagram illustrating intra-node and inter-node communications for the process placement shown in FIG. 8 according to an exemplary embodiment of the present disclosure.

FIGS. 7-9 illustrate exemplary diagrams of the operation(s) of Sub-Gridding Optimization module 110 and Process Placement Optimization module 120 according to an exemplary embodiment of the present disclosure.

In particular, FIG. 7 shows an exemplary diagram of a two-dimensional process data grid 700 according to an exemplary embodiment of the present disclosure. In particular, FIG. 7 illustrates a user application where the problem data has been divided into multiple pieces 705. This can be referred to as domain decomposition, or partitioned global address space. In this example, the problem data, or grid, can be divided into four (4) rows and six (6) columns. Each sub-domain can be associated with a Cartesian grid position (X, Y).

FIG. 8 shows an exemplary diagram of the associated default MPI process of the two-dimensional data grid 700 illustrated in FIG. 7 according to an exemplary embodiment of the present disclosure. In particular, FIG. 8 illustrates a common default MPI process mapping for a decomposed data grid. As shown in FIG. 8, each compute node can 805 have six (6) sub-domains. The relationship between data grid sub-domains IDs and MPI processes IDs can be calculated as MPIprocessID=subdomain.Xposition*columns.Ydimension+subdomain.Yposition.

FIG. 9 shows an exemplary diagram illustrating the intra-node and inter-node communications resulting from a domain decomposition as illustrated in FIG. 7, and an MPI process placement as provided in FIG. 8, where each sub-domain routine can exchange data with its nearest neighbors. There can be 76 data exchanges in this example, 40 intra-node communications, and 36 inter-node communications. Of course, different number of data exchanges, intra-node communications, and inter-node communications can be provided.

Figure 10:
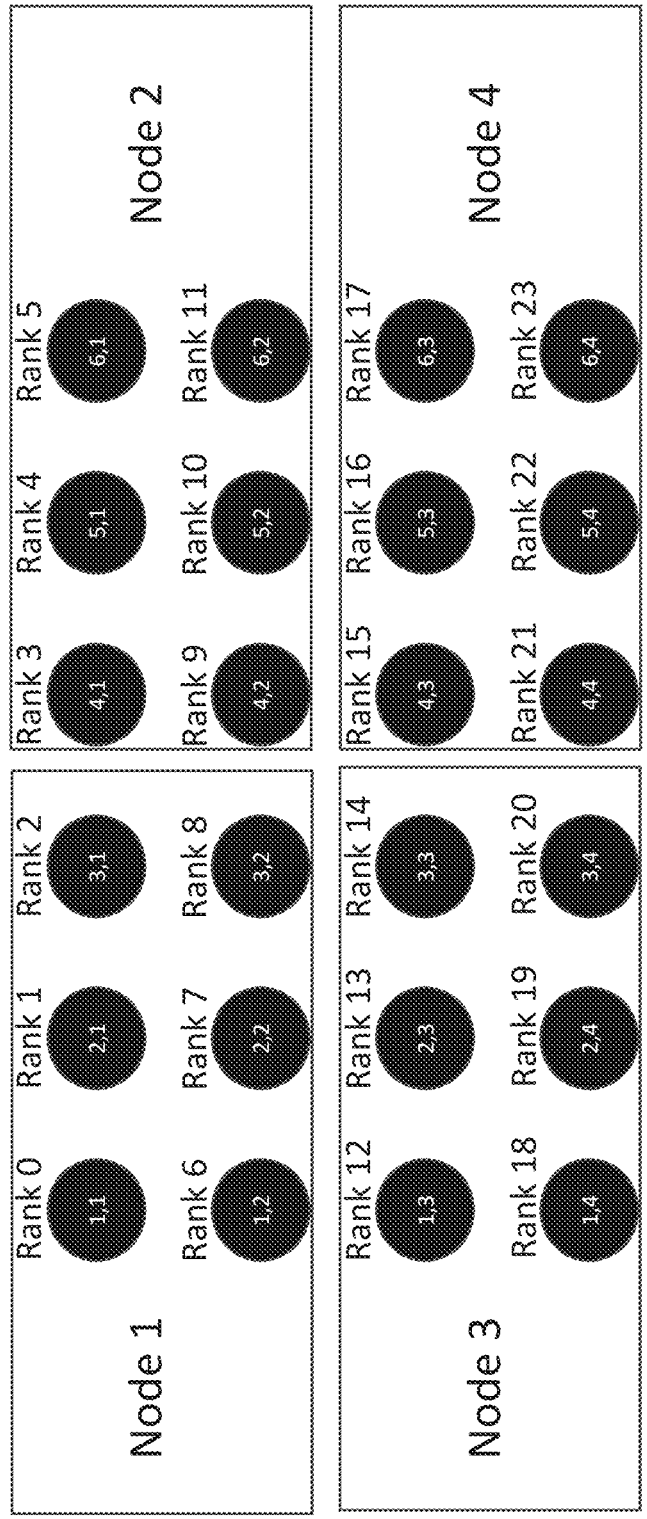
FIG. 10 is an exemplary diagram illustrating the data grid from FIG. 7 showing improved MPI process placement according to an exemplary embodiment of the present disclosure.

FIG. 10 shows an exemplary diagram illustrating the data grid 700 from FIG. 7 showing improved MPI process placement according to an exemplary embodiment of the present disclosure. As shown in FIG. 10, the grouping of MPI processes is different from what is shown in FIG. 8.

Sub-gridding Optimization module 110 was used to determine that each node can hold a 2×3 sub-grid rather than a 1×6 sub-grid as shown in FIG. 8. Note that the application can be unaware of the process placement variation, the relationship between the sub-domains IDs and processes IDs remains the same, and proceeds can be based on its operation. The exemplary sub-gridding procedure is described herein below.

FIG. 11 shows an exemplary diagram illustrating process placement optimization mapping of a real MPI process ID to a virtual MPI process ID as a component according to an exemplary embodiment of the present disclosure. In particular, FIG. 11 illustrates the operation of Process Placement Optimization module 120. MPI processes can have already been dispatched onto nodes by an externally supplied MPI tool. Thus, the exemplary system, method, and computer-accessible medium cannot modify the original process placement. An exemplary virtualization procedure can be used where the real MPI process placement, which can result from the process spawning from MPI tool, can be substituted by a mapping resulting from Process Placement Optimization module 120. User applications can be unaware of this remapping and can operate as per usual.

The exemplary on-the-fly remapping can be implemented by Data Exchange Rerouting module 420 shown in FIG. 4. An exemplary benefit of real-time on-the-fly remapping can be to support multiple MPI tool using Communication Management module 125 shown in FIG. 1. Process placement optimization can be implemented through a variety of exemplary methods or procedures such as, but not limited to, one or more mathematical formula(s) and/or procedure(s) linking process identifiers with sub-grid identifiers, or a catalog, which maps process identifiers to sub-grid identifiers, or a combination thereof. Such a real-time exemplary embodiment of a Process Placement Optimization module 120 can have no pre-requisite requirement for node sizes, and can be used with non-homogeneous nodes dynamically allocated by a workload management tool.

In an exemplary embodiment of the present disclosure, Process Placement Optimization nodule 120 can be used for Cartesian communication patterns (e.g., communications with peers along X, Y, Z coordinates), as well as, non-Cartesian communication patterns. Non-Cartesian communication patterns can occur in applications where peers can communicate among themselves using other grid coordinate features to select their communicating peers. For instance, a process can communicate with peers that can be $2^N$ distance away (e.g., 1, 2, 4, 8, etc.), or with peers where the domain can include contextual data (e.g., water bodies in a weather model). In contrast to existing MPI process placement tools, which use a mathematical relationship between process identifiers and sub-domain identifiers to perform process placement, the use of Process Placement Optimization module 120 by the exemplary system, method, and computer-accessible medium, may not be limited to mathematical relations. It can use information regarding can the relation can be, whether it can be mathematical, random, contextual, etc., and communicating processes between nodes, in order to operate.

Figure 12:
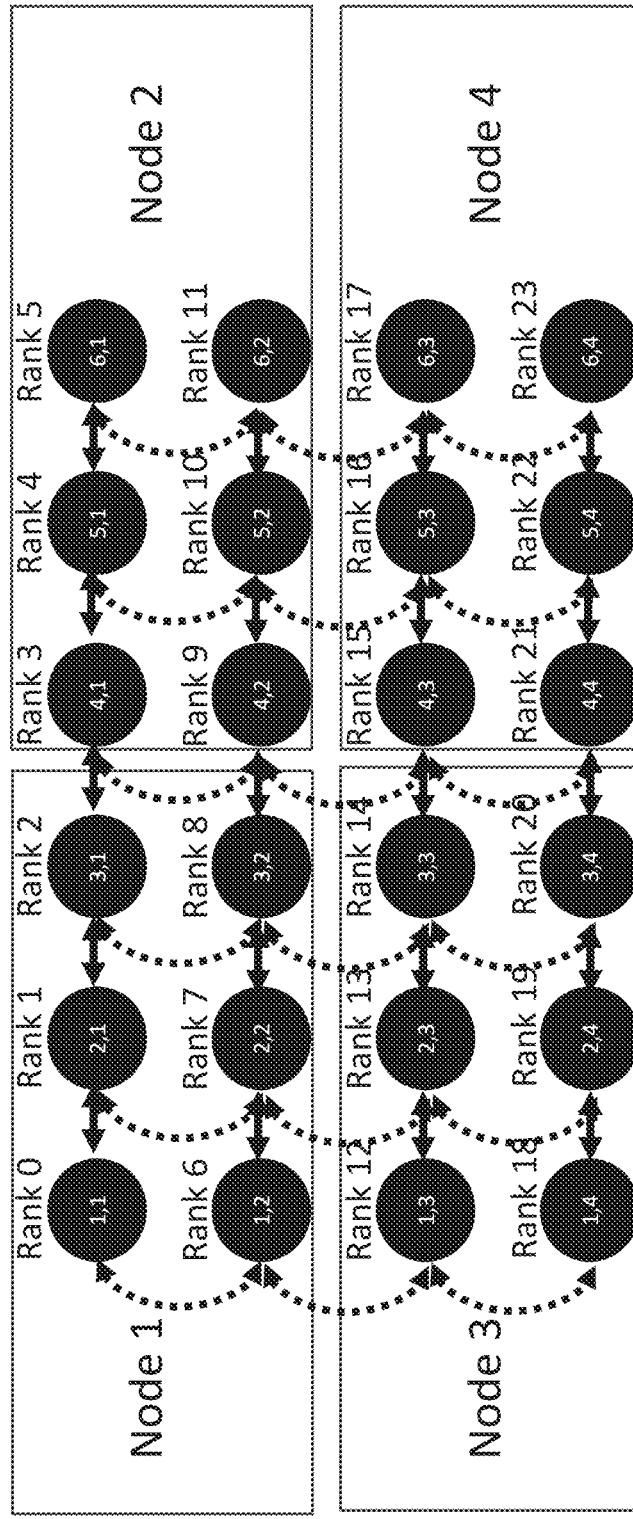
FIG. 12 is an exemplary diagram illustrating intra-node and inter-node communications for the process placement shown in FIG. 11 according to an exemplary embodiment of the present disclosure.

FIG. 12 shows an exemplary diagram illustrating the intra-node and inter-node communication traffic resulting from the combined operation of Sub-gridding Optimization module 110, Process Placement Optimization module 120, and Communication Management module 125, according to an exemplary embodiment of the present disclosure. As shown in FIG. 12, there can still be 76 data exchanges in total, but the number of inter-node communications can be reduced from 36 to 20.

Figure 13:
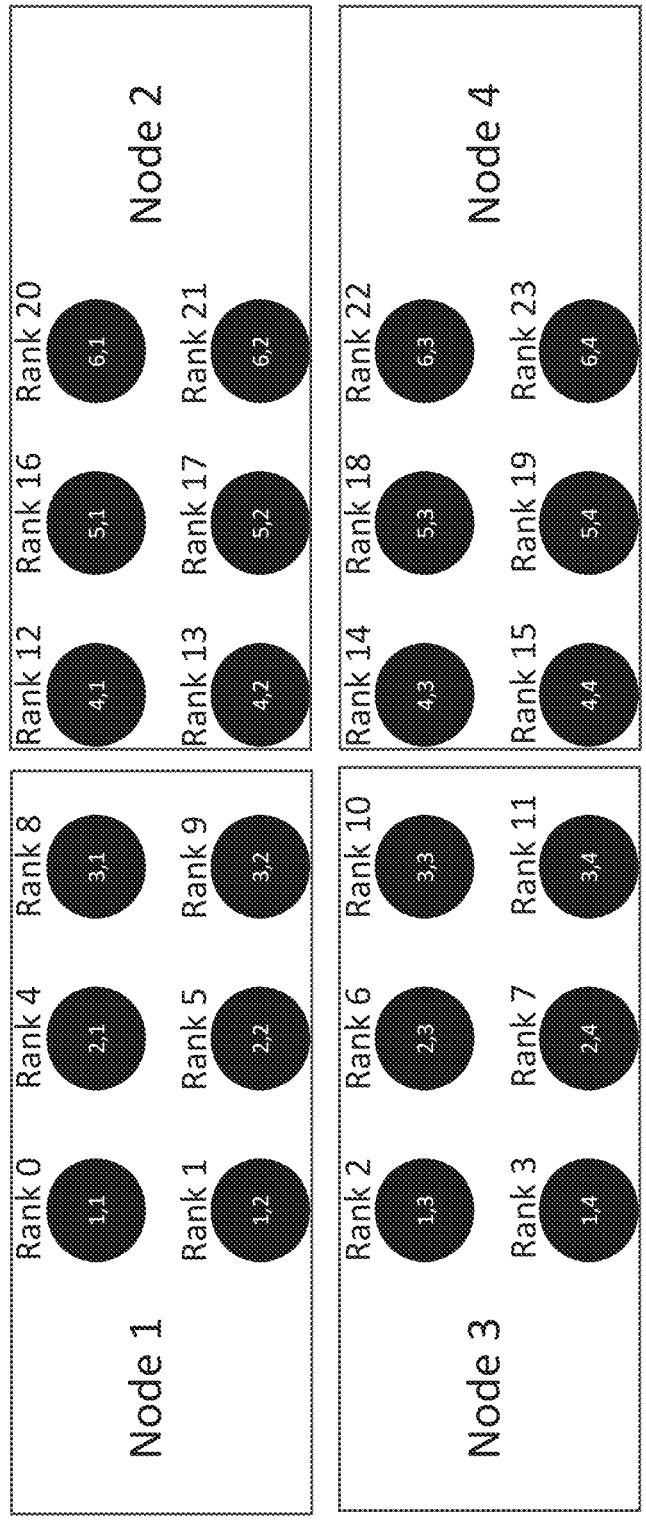
FIG. 13 is a further exemplary diagram illustrating a data grid showing an optimized MPI process placement according to an exemplary embodiment of the present disclosure.

FIG. 13 shows a further exemplary diagram illustrating a data grid showing an optimized MPI process placement according to an exemplary embodiment of the present disclosure. As illustrated in FIG. 13, a process placement alternative to FIG. 10 can be provided where MPI ranks can be written in YX order (e.g., matrix transpose) instead of the XY order used in FIG. 10.

Figure 14:
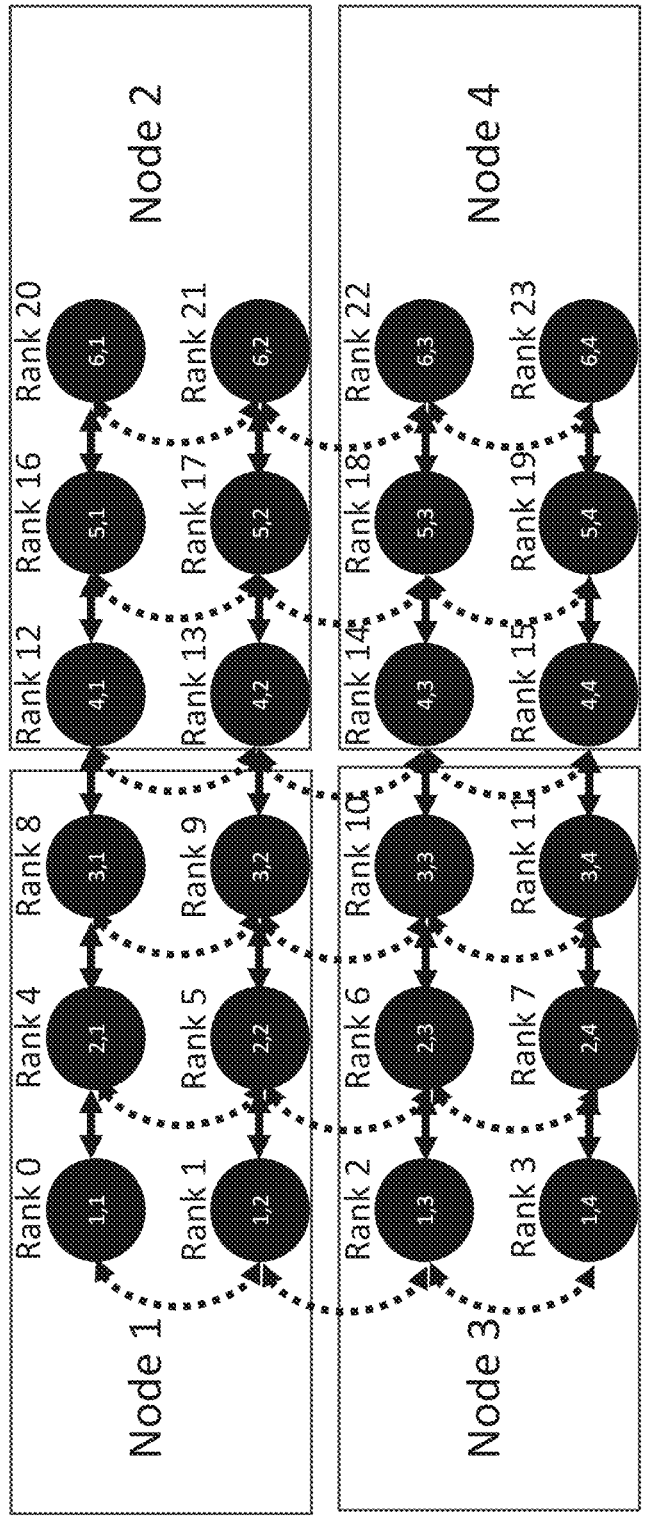
FIG. 14 is an exemplary diagram illustrating intra-node and inter-node communications for the process placement shown in FIG. 13 according to an exemplary embodiment of the present disclosure.

FIG. 14 shows an exemplary diagram illustrating intra-node and inter-node communications for the process placement provided in FIG. 13 according to an exemplary embodiment of the present disclosure. As shown in FIG. 14, the effect of a matrix transpose MPI placement is provided on inter-node communications. MPI applications number sub-grids in XY, YX for 2D problems, as well as XYZ, XZY, YXZ, YZX, ZXY, and ZYX order for 3D problems as there may not be set rules in this field. Additionally, FIG. 14 shows the effect of varying domain decomposition order on the exemplary system, method, and computer-accessible medium.

Figure 15:
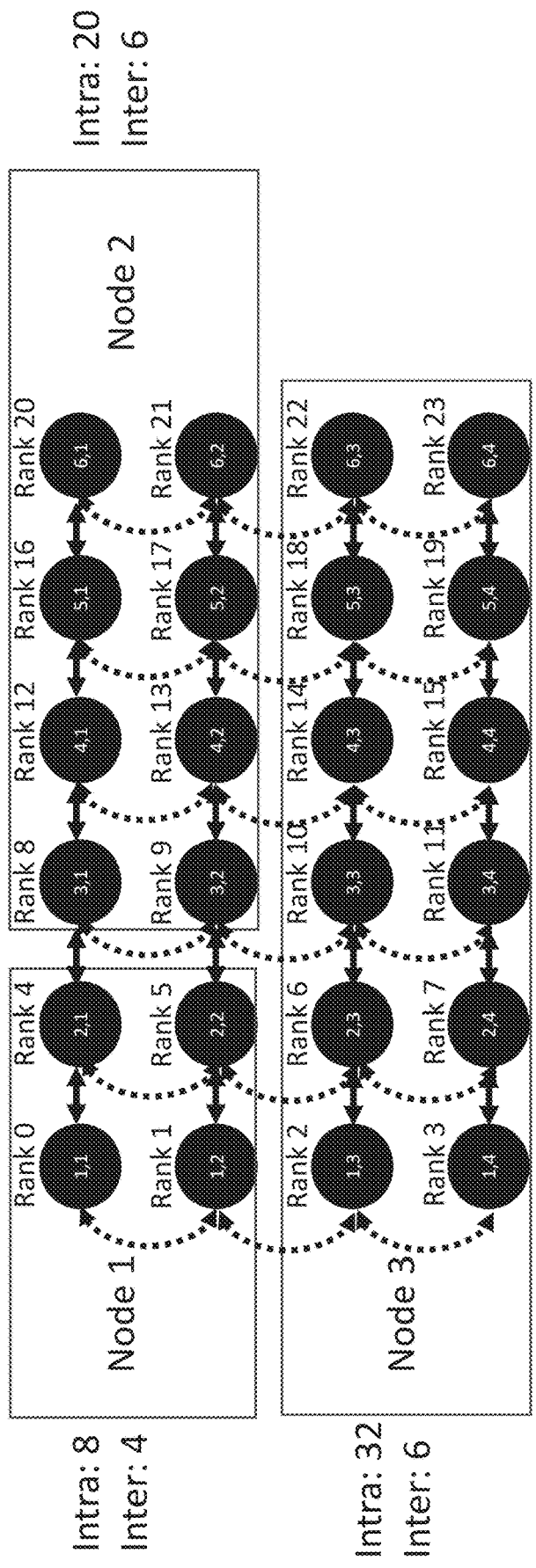
FIG. 15 is an exemplary diagram illustrating intra-node and inter-node communications for non-homogeneous compute nodes according to an exemplary embodiment of the present disclosure.

FIG. 15 shows the exemplary effect of using non-homogeneous compute nodes on MPI intra-node and inter-node communications in an exemplary embodiment of Sub-gridding Optimization module 110, and Process Placement Optimization module 120, according to an exemplary embodiment of the present disclosure. This can be performed using independent mechanisms to implement sub-gridding and process placement independently, instead of a pre-calculated static relationship as described above.

Figure 16A:
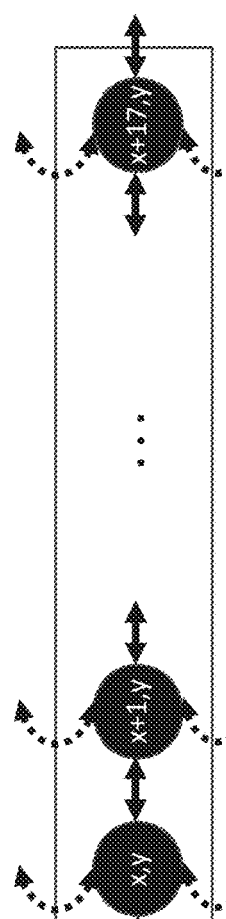
FIGS. 16A-16C are exemplary diagrams illustrating the intra-node and inter-node communications between various sub-gridding methods according to an exemplary embodiment of the present disclosure.
Figure 16B:
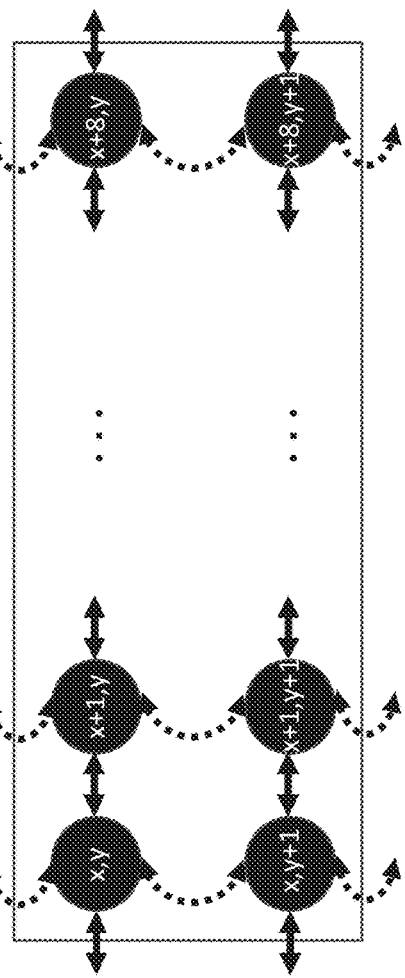
Figure 16C:
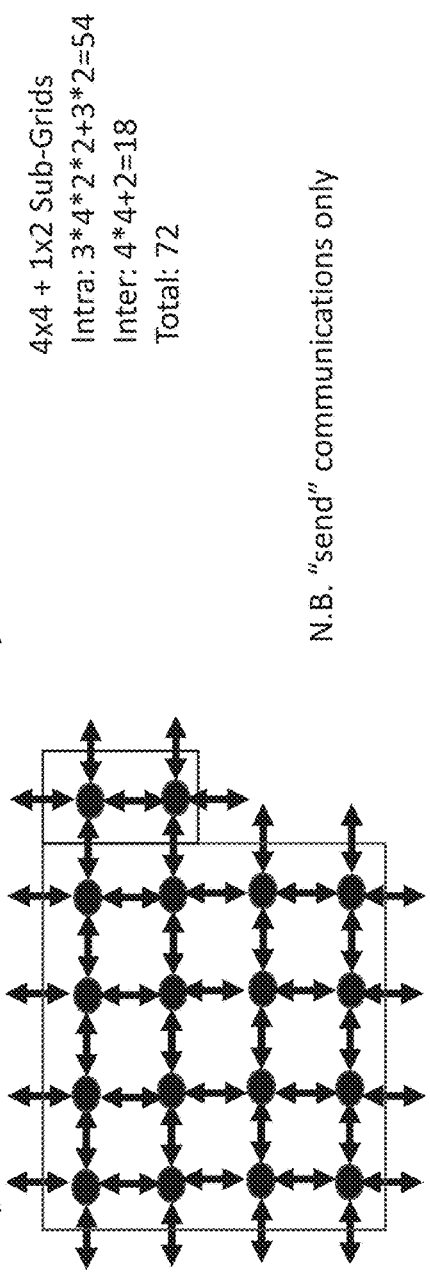

FIGS. 16A-16C show exemplary diagrams illustrating the intra-node and inter-node communications between various sub-gridding methods according to an exemplary embodiment of the present disclosure. As shown in FIGS. 16A-16C, there is an additional benefit of separating process placement and sub-gridding mechanisms, versus using pre-calculated static relationships. For example, it can be possible to implement Sub-gridding Optimization module 110 and Process Placement Optimization module 120, to facilitate multiple sub-grids to be defined per node. Multiple subgrids can be used to improve inter-node communication optimization further than using a single subgrid per node as illustrated in FIG. 16A (e.g., a 1×18 subgrid), a 2×9 subgrid as shown in FIG. 16B, and 4×4 and 1×2 subgrids as shown in FIG. 16C. The use of multiple subgrids per node can facilitate MPMD programming paradigms where more than one cooperating MPI application can coexist in the same compute node. This can be referred to as model coupling in climatology for instance.

FIG. 17 shows a diagram illustrating the optimization of sub-gridding using an exemplary procedure according to an exemplary embodiment of the present disclosure. As illustrated in FIG. 17, an exemplary embodiment of a sub-gridding optimization procedure can be provided that uses Sub-gridding Optimization module 110 shown in FIG. 1. In the exemplary 2D 4×4 subgrid, it can be observed that the number of inter-node communications can be equal to the sum of the periphery of the sub-domains: 16 communication exchanges (e.g., 4+4+4+4). To minimize the number of inter-node communications, a sub-gridding procedure can be used that can minimize the periphery. This can occur when the periphery can be as close as possible to side-size=SQRT (#cores). Since the size of an edge can be a whole number, the closes pair of whole numbers can be found given that min(#cores−s1*s2) and min (|s1−s2|), wherein N.B. |s1−s2| can be the absolutely value of the difference. An exemplary sub-gridding procedure can be used to minimize inter-node communications. This exemplary procedure can sub-grid an 18 sub-domain problem into a 4×4 sub-grid and a 1×2 sub-grid as per FIGS. 16A-16C. The exemplary sub-gridding procedure can be as follows:

```
for (i=1,remain=ncores;remain>0;i++,remain-=side1*side2) {
   for (side2=side1=1+sqrt(remain);side1*side2>remain;side1--,side2=remain/side1);
   printf("sub-grid #%d %d x %d\n",i,side1 ,side2);
}
```

The exemplary sub-gridding procedure described above can be further refined. For example, the exemplary sub-gridding procedure can take into consideration the problem size and orient sub-grids to reduce fragmentation. For example, a 32×21 problem size using 56 core nodes can function work best with 8×7 sub-grids, yielding exactly 4 sub-grids in the first dimension, and exactly 3 sub-grids in the second dimension, resulting in exactly 12 fully populated (e.g., 8×7 elements, matching 56 compute core nodes) sub-grids in total. Using 7×8 sub-grids instead would yield 4 full sub-grids in the first dimension with 4 remaining elements in a fifth sub-grid, and 2 full sub-grids in the second dimension with 5 remaining elements in a third sub-grid. This can result in 8 fully populated (e.g., 7×8 elements each) sub-grids and 4 partially populated (e.g., 4×5 elements each) sub-grids.

Another exemplary refinement to the exemplary sub-gridding procedure described above can, for example, include a weight factor applied to the problem dimension. Below is a simplified code sample illustrating assigning a weight factor to each of two dimensions to perform sub-gridding that minimizes inter-node communications:

```
nn=number-of-cores-on-node;
dxw=communication-weight-in-first-dimension;
dyw=communication-weight-in-second-dimension;
bestscore=bestX=bestY=0;
for (dx=1 ;dx<=nn;dx++) {
   if (nn%dx!=0) continue;
   dy=nn/dx;
   if (nn%dy!=0) continue;
   if (dx*dy!=nn) continue;
   score = dx*dxw+dy*dyw;
   if (score>bestscore) {
      bestscore=score;
      bestX=dx;
      bestY=dy;
   }
}
printf("Optimal sub-grid dx=%d dy=%d\n",dx,dy);
```

The sub-gridding refinements presented above can be combined. These refinements are not exhaustive; more sub-gridding refinements can be added to cope with relative processor performance, network topology, etc.

The exemplary system, method, and computer-accessible medium can determine the optimized sub-grid size, which can reduce the number of inter-node communications, based on the number of cores per node and grid dimensions. Additionally, the exemplary system, method, and computer-accessible medium can generate a map of the MPI processes to the nodes to co-locate the processes that belong to the same sub-grid. This exemplary procedure can be implemented as a library called by the application upon startup, and it can include fewer than 10 lines of code change. Alternatively, the exemplary procedure can be implemented as a pre-step to the workload manager to generate a rank file. Additionally, such exemplary procedure can be imbedded within the workload manager itself as a process layout option.

The exemplary system, method, and computer-accessible medium can also be applied recursively to a system composed of compute nodes, where each node can be a collection of interconnected processors, and where each processor can be a collection of interconnected processor cores.

Interconnect properties, which can be based on Infiniband, Ethernet, or other technologies, can also apply to the inter-processor fabric connecting processors in a single compute node. Thus, the exemplary system, method, and computer-accessible medium, according to an exemplary embodiment of the present disclosure, can be applied recursively to a system that can include compute nodes, where each node can be a collection of interconnected processors, and therefore each processor can be a collection of interconnected processor cores.

The exemplary system, method and computer-accessible medium, according to an exemplary embodiment of the present disclosure, can use knowledge of communication patterns to implement a message aggregation-distribution method such that all messages exchanged between peer pairs on different compute nodes can first aggregate all messages being sent into a single large message, then a single peer can send the composite message. Its peer can receive the composite message and can distribute the messages to the other peers on the same system. Such mechanism can enhance interconnect utilization by reducing congestion at the host channel adapter (e.g. network card) level. For example, in a 2D domain decomposition problem, because of the combined sub-gridding and mapping processes, the processes along the edge of a sub-grid on a compute node can communicate with the processes on the edge of the sub-grid on another compute node. Thus, a 2D problem can result in, e.g., four (4) compute nodes taking part in communications for a sub-grid. Without the sub-gridding and mapping mechanism, processes on a compute node can communicate with a varying number of other compute nodes.

The exemplary system, method and computer-accessible medium, according to an exemplary embodiment of the present disclosure, can improve congestion management at the network fabric interconnect level (e.g. network switch) due to its sub-gridding and mapping operation. Based on the combined sub-gridding and mapping mechanisms, communicating processes along a sub-grid edge can communicate with fewer compute nodes than with alternative mapping procedures. This can result in less congestion within the network fabric interconnect.

The exemplary system, method, and computer-accessible medium, according to an exemplary embodiment of the present disclosure, can include pre-loading a library (e.g., Data Exchange Trap module 410) to intercept MPI calls and substitute, using Date Exchange Intercept module 415, on-the-fly, the original MPI communicator with one provided by the exemplary system, method, and computer-accessible medium (e.g., using Data Exchange Rerouting module 420).

Using the MPI's own process remapping primitives, the exemplary system, method, and computer-accessible medium can generate a new communicator where process locations can be used to optimize inter-node communications. Thus, the exemplary system, method, and computer-accessible medium be simple, light weight, and does not need to implement any modifications to the operating system, workload manager (ex. SLURM), MPI library, and can operate on application binaries.

The exemplary embodiment described above can be further expanded to substitute and replace on-the-fly any MPI communicator, not just the original MPI_COMM_WORLD communicator, and can be applied to multiple MPI communicators simultaneously. Thus, it can be possible to optimize communication exchanges in more than one level of communications at a time within a single application. The exemplary system, method and computer-accessible medium, according to an exemplary embodiment of the present disclosure, can also utilize knowledge of the application and system characteristics in order to provide statistics gathering, performance monitoring and analysis, which can be used to provide circumstance specific behavior based on processor/system type or user credentials.

Preliminary tests observed an MPI bandwidth increase of 52% using 252 MPI processes on 9 nodes (e.g., 28 cores/node). A 128 cores/node system can increase MPI bandwidth by over 80%. The MPI bandwidth can be the bandwidth of all MPI inter-node communications (e.g., through Infiniband interconnect) and the bandwidth of all MPI intra-node communications (e.g., through shared memory).

Figure 18:
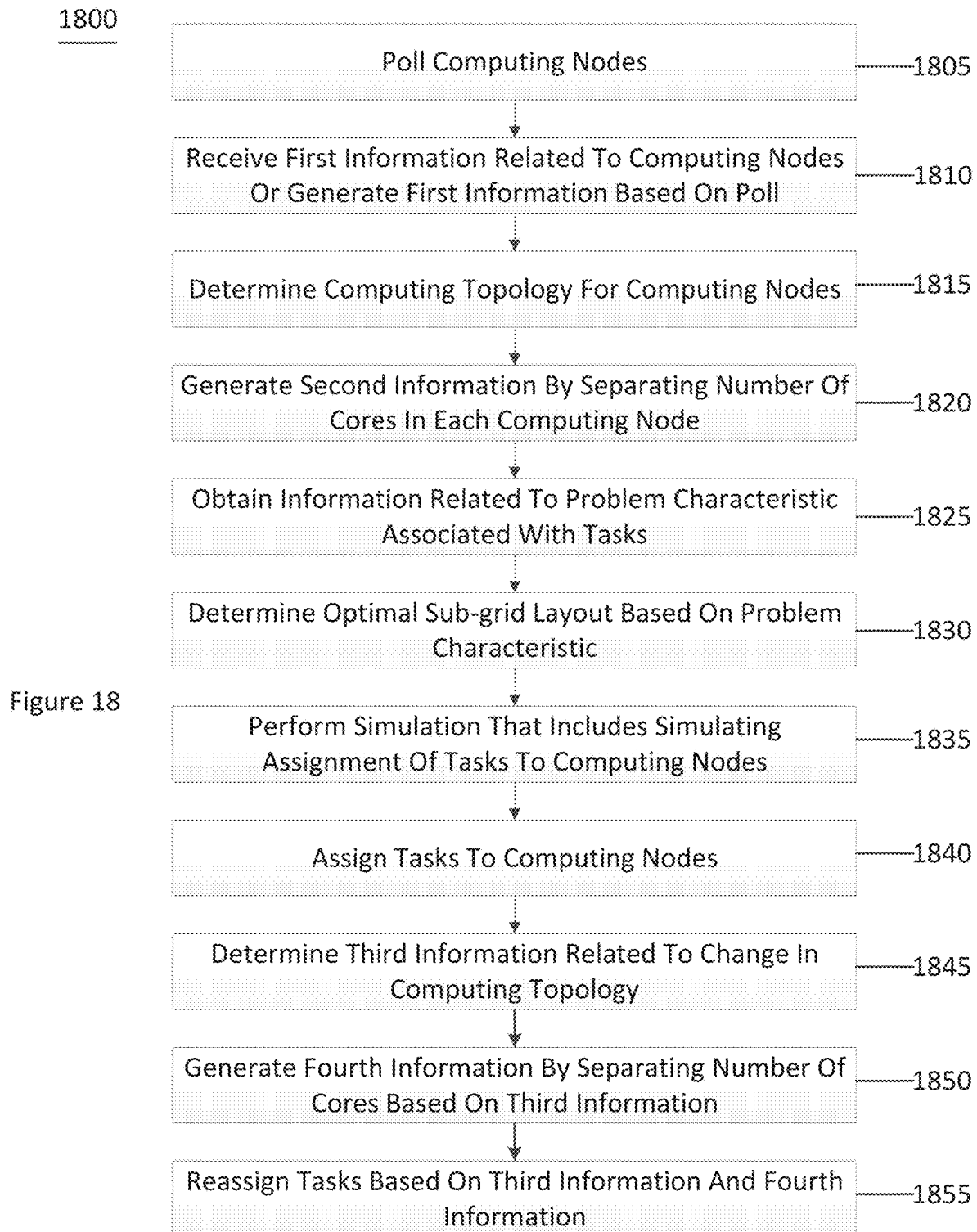
FIG. 18 is an exemplary flow diagram of a method for assigning a plurality of tasks to a plurality of computing nodes according to an exemplary embodiment of the present disclosure.
Figure 19:
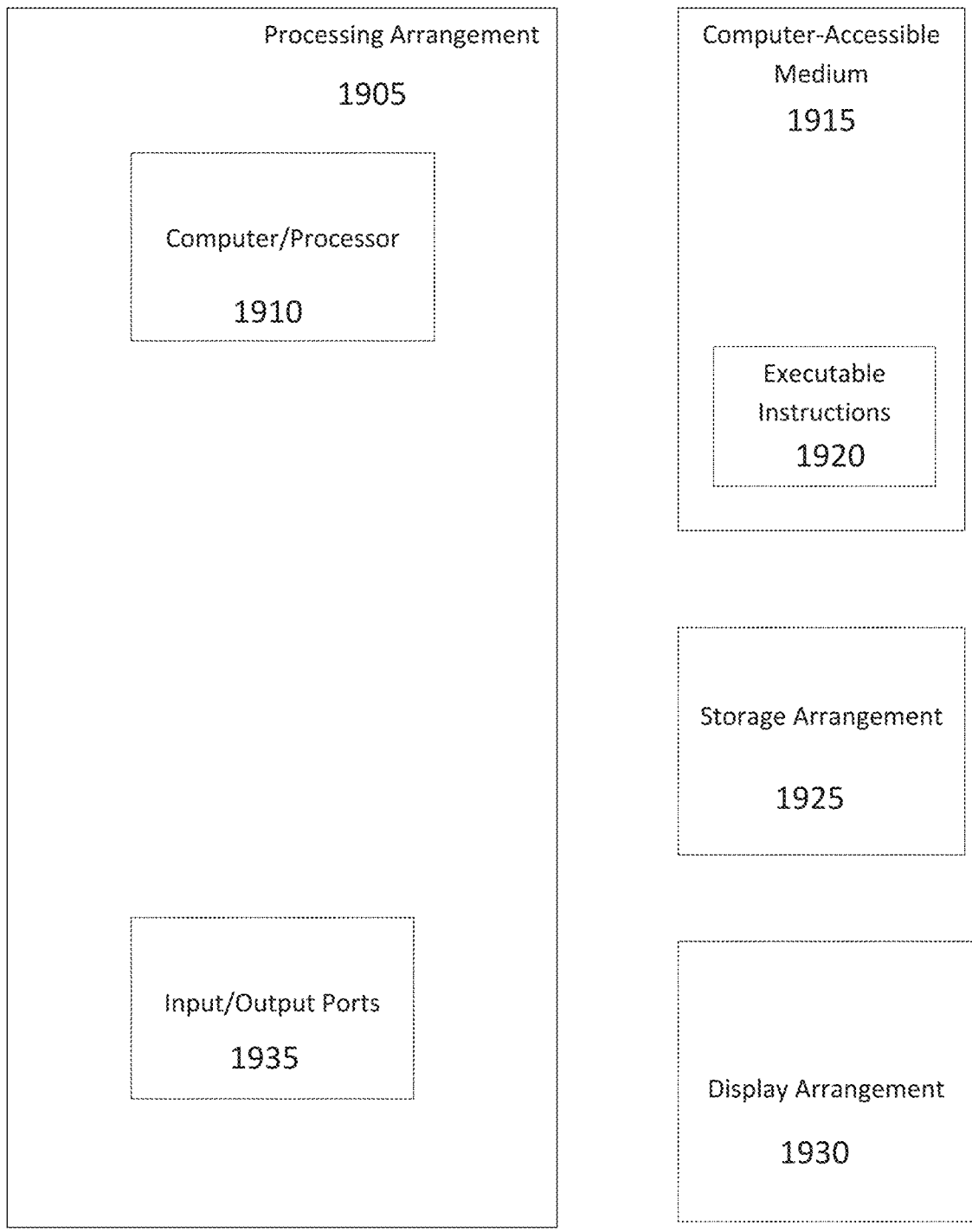
FIG. 19 is an illustration of an exemplary block diagram of an exemplary system in accordance with certain exemplary embodiments of the present disclosure.

FIG. 18 shows an exemplary flow diagram of a method 1800 for assigning a plurality of tasks to a plurality of computing nodes according to an exemplary embodiment of the present disclosure. For example, at procedure 1805, the computing nodes can be polled. At procedure 1810, first information related to the computing nodes can be received, or the first information can be generated based on the poll. At procedure 1815, a computing topology for the computing nodes can be determined. At procedure 1820, second information can be generated by separating the number of cores in each of the computing nodes. At procedure 1825, information related to a problem characteristic associated with the tasks can be obtained. At procedure 1830, an optimal sub-grid layout can be determined based on the problem characteristic. At procedure 1835, a simulation can be performed that can include simulating an assignment of the tasks to the computing nodes. At procedure 1840, the tasks can be assigned to the computing nodes based on the second information, the problem characteristic, the optimal sub-grid layout, and/or the simulation. At procedure 1845, third information related to a change in the computing topology can be determined. At procedure 1850, fourth information can be generated by separating the number of cores based on the third information. At procedure 1855, the tasks can be reassigned based on the third information and the fourth information FIG. 19 shows a block diagram of an exemplary embodiment of a system according to the present disclosure. For example, exemplary procedures in accordance with the present disclosure described herein can be performed by a processing arrangement and/or a computing arrangement 1905. Such processing/computing arrangement 1905 can be, for example entirely or a part of, or include, but not limited to, a computer/processor 1910 that can include, for example one or more microprocessors, and use instructions stored on a computer-accessible medium (e.g., RAM, ROM, hard drive, or other storage device).

As shown in FIG. 19, for example a computer-accessible medium 1915 (e.g., as described herein above, a storage device such as a hard disk, floppy disk, memory stick, CD-ROM, RAM, ROM, etc., or a collection thereof) can be provided (e.g., in communication with the processing arrangement 1905). The computer-accessible medium 1915 can contain executable instructions 1920 thereon. In addition or alternatively, a storage arrangement 1925 can be provided separately from the computer-accessible medium 1915, which can provide the instructions to the processing arrangement 1905 to configure the processing arrangement to execute certain exemplary procedures, processes, and methods, as described herein above, for example.

Further, the exemplary processing arrangement 1905 can be provided with or include an input/output ports 1935, which can include, for example a wired network, a wireless network, the internet, an intranet, a data collection probe, a sensor, etc. As shown in FIG. 19, the exemplary processing arrangement 1905 can be in communication with an exemplary display arrangement 1930, which, according to certain exemplary embodiments of the present disclosure, can be a touch-screen configured for inputting information to the processing arrangement in addition to outputting information from the processing arrangement, for example. Further, the exemplary display arrangement 1930 and/or a storage arrangement 1925 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties

EXEMPLARY REFERENCES

The following publications and information, as applicable, are hereby incorporated by reference, in their entireties:

[1] https://ieeexplore.ieee.org/abstract/document/6702677
[2] https://pdfs.semanticscholar.org/be9c/63c174dd36334-3227ffd266d68f321a9f456.pdf
[3] https://www.hpcadvisorycouncil.com/pdf/WRF_Analysis_and_Profiling_AMD_6276.pdf
[4] https://slurm.schedmd.com/topology.html
[5] https://slurm.schedmd.com/sbatch.html
[6] https://slurm.schedmd.com/core_spec.html
[7] https://docs.oracle.com/cd/E19957-01/820-0698/6ncd-vjcmd/index.html

[8] http://gridengine.eu/grid-engine-internals?start=10
[9] http://docs.adaptivecomputing.com/torque/4-1-3/help.htm#topics/2-jobs/requestingRes.htm
[10] https://www.ibm.com/supp ort/knowledgecenter/en/SSETD4_9.1.2/1sf_command_ref/bsu b.1.html
[11] https://www.open-mpi.org/doc/v3.0/man1/mpiexec.1.php
[12] https://pubs.cray.com/content/S-2376/7.0.0/cray-performance-measurement-and-analysis-tools-user-guide/about-the-cray-performance-measurement-and-analysis-tools-user-guide
[13] http://www.hector.ac.uk/coe/cray-xe6-workshop-2012-Nov/pdf/craypat.pdf
[14] http://gridscheduler.sourceforge.net/
[15] https://www.ibm.com/support/knowledgecenter/SSETD4_9.1.3/lsf_welcome.html
[16] https://www.altair.com/pbs-professional/
[17] https://www.pbspro.org
[18] https://www.mcs.anl.gov/research/projects/openpbs/
[19] https://support.adaptivecomputing.com/wp-content/uploads/2019/06/Moab-HPC-Suite_datasheet_20190611.pdf
[20] https://research.cs.wisc.edu/htcondor/
[22] https://www.ibm.com/support/knowledgecenter/SSFJTW_5.1.0/com.ibm.cluster.load1.v5r1.load100.doc/am2ug_ch1.htm
[23] https://www.open-mpi.org/
[24] http://mvapich.cse.ohio-state.edu/
[25] https://www.mpich.org/
[26] http://www.openshmem.org/site/
[27] http://www.openmp.org/
[28] https://www.csm.ornl.gov/pvm/
[29] https://pubs.cray.com/content/S-2529/17.05/xctm-series-programming-environment-user-guide-1705-s-2529/mpt
[30] https://downloads.linus.hpe.com/SDR/project/mpi/
[31] https://software.intel.com/en-us/mpi-library
[32] https://www.ibm.com/ae-en/marketplace/spectrum-mpi

What is claimed is:

1. A non-transitory computer-accessible medium having stored thereon computer-executable instructions for assigning a plurality of tasks to a plurality of computing nodes, wherein, when a computer arrangement executes the instructions, the computer arrangement is configured to perform procedures comprising:
(a) receiving first information related to the computing nodes, wherein the first information includes a number of cores in each of the computing nodes;
(b) generating second information by separating the number of cores in each of the computing nodes;
(c) assigning the tasks to the computing nodes based on the second information and at least one problem characteristic, wherein one or more of the computing notes are executing one or more applications during a performance of procedures (a)-(c), and wherein the at least one problem characteristic includes at least one of (i) a first number of dimensions in a grid, (ii) a second number of dimensions in at least one axis of the grid, or (iii) a third number of points of the grid in a Message Passing Interface process; and
(d) substituting one or more identifications of one or more of the tasks during the performance of the procedures (a)-(c) and the execution of the one or more applications while the one or more applications are unaware of the substitution.

2. The computer-accessible medium of claim 1, wherein the first information further includes at least one of:
(A) (i) a distance of a network connection between each of the computer nodes, and (ii) a bandwidth of the network connection, or
(B) includes a distance to at least one nearest neighbor node.

3. The computer-accessible medium of claim 1, wherein the computer arrangement is configured to generate the second information based on the tasks.

4. The computer-accessible medium of claim 3, wherein the computer arrangement is configured to generate the second information based on a number of dimensions of the tasks.

5. The computer-accessible medium of claim 3, wherein the computer arrangement is further configured to:
obtain information related to at least one problem characteristic associated with at least one of the tasks; and
assign the tasks to the computing nodes based on the at least one problem characteristic.

6. The computer-accessible medium of claim 5, wherein the computer arrangement is configured to:
determine an optimal sub-grid layout based on the at least one problem characteristic; and
assign the tasks based on the optimal sub-grid layout.

7. The computer-accessible medium of claim 1, wherein the computer arrangement is further configured to:
perform at least one simulation that includes simulating an assignment of the tasks to the computing nodes; and
assign the tasks based on the at least one simulation.

8. The computer-accessible medium of claim 1, wherein the computer arrangement is configured to perform the at least one simulation based on at least one application statistic.

9. The computer-accessible medium of claim 8, wherein the at least one application statistic includes statistics from at least one previous simulation.

10. The computer-accessible medium of claim 1, wherein procedure (d) is performed using a sub-grid which includes one or more actual identifications for the one or more of the tasks and one or more associated substitute identifications for the one or more of the tasks.

11. The computer-accessible medium of claim 10, wherein procedure (d) substitutes the one or more actual identification with the associated one or more substitute identifications during the execution of the one or more applications without any awareness of the substitution.

12. The computer-accessible medium of claim 1, wherein procedure (d) is performed using multiple sub-grids, each of which includes one or more actual identifications for the one or more of the tasks and one or more associated substitute identifications for the one or more of the tasks.

13. The computer-accessible medium of claim 1, wherein procedures (a)-(d) are performed recursively for communications between the computing nodes and within one or more of the computing nodes.

14. The computer-accessible medium of claim 1, wherein the tasks operate on a shared memory or utilize the shared memory to communicate with one another.

15. The computer-accessible medium of claim 1, wherein the computer arrangement is further configured simulate or mimic at least one different ratio of a count of cores of processors to a bandwidth of one or more communication networks by reducing or throttling of the bandwidth.

16. The computer-accessible medium of claim 1, wherein the one or more tasks provide messages between one another, and wherein the messages are aggregated.

17. A system for assigning a plurality of tasks to a plurality of computing nodes, comprising:
a computer hardware arrangement configured to:
(a) receive first information related to the computing nodes, wherein the first information includes a number of cores in each of the computing nodes;
(b) generate second information by separating the number of cores in each of the computing nodes;
(c) assign the tasks to the computing nodes based on the second information and at least one problem characteristic, wherein one or more of the computing notes are executing one or more applications during a performance of procedures (a)-(c), and wherein the at least one problem characteristic includes at least one of (i) a first number of dimensions in a grid, (ii) a second number of dimensions in at least one axis of the grid, or (iii) a third number of points of the grid in a Message Passing Interface process; and
(d) substitute one or more identifications of one or more of the tasks during the performance of the procedures (a)-(c) and the execution of the one or more applications while the one or more applications are unaware of the substitution.

18. A method for assigning a plurality of tasks to a plurality of computing nodes, comprising:
(a) receiving first information related to the computing nodes, wherein the first information includes a number of cores in each of the computing nodes;
(b) generating second information by separating the number of cores in each of the computing nodes; and
(c) using a computer hardware arrangement, assigning the tasks to the computing nodes based on the second information and at least one problem characteristic, wherein one or more of the computing notes are executing one or more applications during a performance of procedures (a)-(c), and wherein the at least one problem characteristic includes at least one of (i) a first number of dimensions in a grid, (ii) a second number of dimensions in at least one axis of the grid, or (iii) a third number of points of the grid in a Message Passing Interface process; and
(d) substituting one or more identifications of one or more of the tasks during the performance of the procedures (a)-(c) and the execution of the one or more applications while the one or more applications are unaware of the substitution using a computer hardware arrangement, assigning the tasks to the computing nodes based on the second information.

19. A non-transitory computer-accessible medium having stored thereon computer-executable instructions for assigning a plurality of tasks to a plurality of computing nodes, wherein, when a computer arrangement executes the instructions, the computer arrangement is configured to perform procedures comprising:
(a) receiving first information related to the computing nodes, wherein the first information includes a number of cores in each of the computing nodes;
(b) generating second information by separating the number of cores in each of the computing nodes; and
(c) assigning the tasks to the computing nodes based on the second information, wherein one or more of the computing notes are executing one or more applications during a performance of procedures (a)-(c); and
(d) substituting one or more identifications of one or more of the tasks during the execution of the one or more applications (i) while the one or more applications are unaware of the substitution, and (ii) without a Message Passing Interface (MPI) library, an operating system, or a workload manager being aware of the substitution.

20. A system for assigning a plurality of tasks to a plurality of computing nodes, comprising:
a computer hardware arrangement configured to:
(a) receive first information related to the computing nodes, wherein the first information includes a number of cores in each of the computing nodes;
(b) generate second information by separating the number of cores in each of the computing nodes; and
(c) assign the tasks to the computing nodes based on the second information, wherein one or more of the computing notes are executing one or more applications during a performance of procedures (a)-(c); and
(d) substitute one or more identifications of one or more of the tasks during the execution of the one or more applications (i) while the one or more applications are unaware of the substitution, and (ii) without a Message Passing Interface (MPI) library, an operating system, or a workload manager being aware of the substitution.

21. A method for assigning a plurality of tasks to a plurality of computing nodes, comprising:
(a) receiving first information related to the computing nodes, wherein the first information includes a number of cores in each of the computing nodes;
(b) generating second information by separating the number of cores in each of the computing nodes; and
(c) using a computer hardware arrangement, assigning the tasks to the computing nodes based on the second information, wherein one or more of the computing notes are executing one or more applications during a performance of procedures (a)-(c); and
(d) substituting one or more identifications of one or more of the tasks during the execution of the one or more applications (i) while the one or more applications are unaware of the substitution, and (ii) without a Message Passing Interface (MPI) library, an operating system, or a workload manager being aware of the substitution.

* * * * *